(12) United States Patent
Suzuki

(10) Patent No.: US 9,415,579 B2
(45) Date of Patent: Aug. 16, 2016

(54) RECORDING APPARATUS AND TRANSPORT METHOD

(71) Applicant: Seiko Epson Corporation, Shinjuku-ku, Tokyo (JP)

(72) Inventor: Katsuhito Suzuki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/487,401

(22) Filed: Sep. 16, 2014

(65) Prior Publication Data

US 2015/0000542 A1 Jan. 1, 2015

Related U.S. Application Data

(62) Division of application No. 12/731,107, filed on Mar. 24, 2010, now abandoned.

(30) Foreign Application Priority Data

Mar. 25, 2009 (JP) ................................. 2009-075118

(51) Int. Cl.
| | |
|---|---|
| *B65H 29/20* | (2006.01) |
| *B41F 17/00* | (2006.01) |
| *B41J 3/28* | (2006.01) |
| *B41J 3/407* | (2006.01) |
| *B41J 11/00* | (2006.01) |
| *B41F 21/00* | (2006.01) |
| *B41F 21/04* | (2006.01) |
| *G02B 27/22* | (2006.01) |

(52) U.S. Cl.
CPC ................. *B41F 17/00* (2013.01); *B41F 21/00* (2013.01); *B41F 21/04* (2013.01); *B41J 3/28* (2013.01); *B41J 3/407* (2013.01); *B41J 11/005* (2013.01); *G02B 27/2214* (2013.01)

(58) Field of Classification Search
CPC ............. B65H 29/125; B65H 2404/10; B65H 2511/12; B41J 11/0025
USPC ............... 400/636, 636.3, 637, 639, 624, 629
See application file for complete search history.

(56) References Cited

U.S. PATENT DOCUMENTS

| | | | | |
|---|---|---|---|---|
| 4,205,770 | A | * | 6/1980 | Wojdyla ........................... 226/49 |
| 4,475,833 | A | * | 10/1984 | Sawicki ......................... 400/605 |
| 4,992,805 | A | * | 2/1991 | Yoshizawa ........... B41J 2/16511 346/104 |

(Continued)

FOREIGN PATENT DOCUMENTS

| | | |
|---|---|---|
| JP | 01-232080 A | 9/1989 |
| JP | 02-225237 A | 9/1990 |

(Continued)

OTHER PUBLICATIONS

Non-Final Rejection of Jan. 25, 2013 in related U.S. Appl. No. 12/731,107—12 pages.

(Continued)

*Primary Examiner* — Leslie J Evanisko
(74) *Attorney, Agent, or Firm* — Kilpatrick Townsend & Stockton LLP

(57) ABSTRACT

A recording apparatus includes: a transport mechanism that transports a recording medium having a lenticular lens in a transport direction; and a guide that includes a convex portion formed along the transport direction and guides the recording medium in the transport direction by allowing the convex portion to come in contact with the lenticular lens.

13 Claims, 18 Drawing Sheets

(56) References Cited

U.S. PATENT DOCUMENTS

| | | | |
|---|---|---|---|
| 5,163,675 A * | 11/1992 | Sunohara | 271/274 |
| 5,812,152 A | 9/1998 | Torigoe et al. | |
| 5,867,322 A | 2/1999 | Morton | |
| 5,938,355 A * | 8/1999 | Suzuki | B41J 13/103 271/121 |
| 6,133,928 A | 10/2000 | Kayashima et al. | |
| 6,171,002 B1 * | 1/2001 | Momose et al. | 400/73 |
| 6,682,069 B2 * | 1/2004 | Shibabuki | 271/274 |
| 2001/0021333 A1 * | 9/2001 | Fujioka et al. | 400/624 |
| 2001/0048458 A1 | 12/2001 | Pilu | |
| 2002/0171727 A1 | 11/2002 | Kida et al. | |
| 2005/0168557 A1 * | 8/2005 | Ohyama | B41J 11/005 347/104 |
| 2007/0235923 A1 * | 10/2007 | Keller | 271/264 |
| 2009/0079770 A1 | 3/2009 | Suzuki | |
| 2010/0242752 A1 | 9/2010 | Suzuki | |
| 2012/0062677 A1 * | 3/2012 | Sawada | 347/104 |

FOREIGN PATENT DOCUMENTS

| | | |
|---|---|---|
| JP | 04-136836 A | 5/1992 |
| JP | 05-138965 A | 6/1993 |
| JP | 2692745 B2 | 12/1997 |
| JP | 10-035946 A | 2/1998 |
| JP | 11-149134 A | 2/1999 |
| JP | 2003-260838 | 9/2003 |
| JP | 3471930 B2 | 12/2003 |
| JP | 2004-142313 A | 5/2004 |
| JP | 2007-130769 A | 5/2007 |

OTHER PUBLICATIONS

Final Rejection of Jul. 3, 2013 in related U.S. Appl. No. 12/731,107—11 pages.

Non-Final Rejection of Nov. 21, 2013 in related U.S. Appl. No. 12/731,107—8 pages.

Final Rejection of Jun. 16, 2014 in related U.S. Appl. No. 12/731,107—14 pages.

* cited by examiner

VALLEY OF LENS   PEAK OF LENS   VALLEY OF GUIDE   PEAK OF GUIDE

Y DIRECTION

RECORDING APPARATUS AND TRANSPORT METHOD

This application is a divisional of U.S. patent application Ser. No. 12/731,107, filed Mar. 24, 2010 (now abandoned), which claims the priority to Japanese Patent Application No. 2009-075118 filed Mar. 25, 2009 (issued as Japanese Patent No. 5,338,424), the entire disclosures of which are incorporated by reference herein.

BACKGROUND

1. Technical Field

The present invention relates to a recording apparatus and a transport method.

2. Related Art

There is known a technique of disposing images on a rear side of a lenticular lens for obtaining a stereoscopic image or an image that changes its picture depending on a viewing angle. When such an image is to be obtained, the image is stuck to the rear side of the lenticular lens. However, directly recording the image on the rear side of the lenticular lens has been also performed.

The image (lenticular image) on the rear side of the lenticular lens needs to be fitted to a lens arrangement of the lenticular lens with good precision. Accordingly, even in the case where the image is recorded to the rear side of the lenticular lens, position adjustment between the lenticular lens and the image with good precision is needed.

In Japanese Patent No. 3,471,930, there is disclosed a technique of detecting a position of a lenticular lens using a sensor and performing recording at a predetermined position on the basis of the detection result. In JP-A-2007-130769, there is disclosed a technique of implementing a countermeasure against a position deviation on a tray of a recording medium placed on the transport tray for enhancing precision of a recording position.

In Japanese Patent No. 3,471,930, a sensor for detecting the position of the lenticular lens is needed, so that costs for the apparatus increase. In Japanese JP-A-2007-130769, even the position deviation of the recording medium with respect to the transport tray is suppressed, when the transport tray is transported while being inclined with respect to a transport direction, the precision of the image recording position on the recording medium is degraded.

SUMMARY

An advantage of some aspects of the invention is that it enhances precision of a recording position with a simple configuration.

According to an aspect of the invention, there is provided a recording apparatus including: a transport mechanism that transports a recording medium having a lenticular lens in a transport direction; and a guide that includes a convex portion formed along the transport direction and guides the recording medium in the transport direction by allowing the convex portion to come in contact with the lenticular lens.

Other features of the invention will be clarified by the specification and the accompanying drawings.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
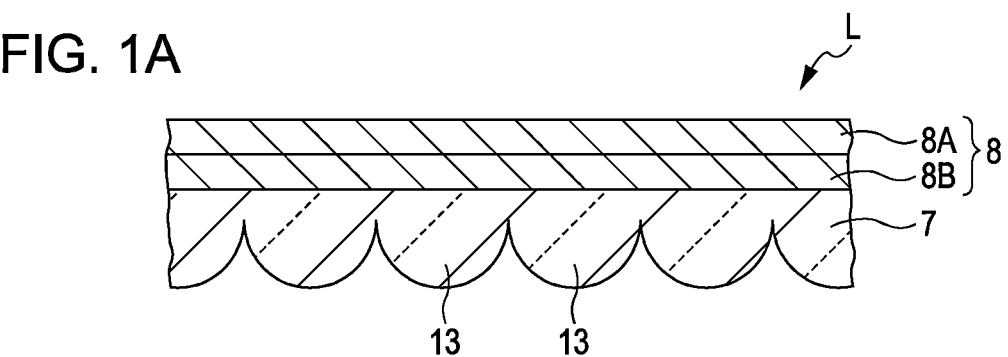
FIG. 1A is an enlarged cross-sectional view of a lens sheet.

At least, the following features are clarified by the specification and the accompanying drawings.

A recording apparatus includes: a transport mechanism that transports a recording medium having a lenticular lens in a transport direction; and a guide that includes a convex portion formed along the transport direction and guides the recording medium in the transport direction by allowing the convex portion to come in contact with the lenticular lens. In the recording apparatus, it is possible to enhance precision in a recording position with a simple configuration.

A pressing member that presses the recording medium against the guide may be included. Accordingly, the movement of the recording medium in a direction crossing the transport direction is limited, so that it is possible to enhance the precision in the recording position.

The pressing member may exert a pressing force on the recording medium which is being transported in the transport direction. Accordingly, it is possible to prevent skewing even when the recording medium is inclined with respect to the guide.

A transport roller that is rotated to transport the recording medium in the transport direction may serve as the pressing member. Accordingly, the transport roller and the pressing member may be implemented for a combined use.

The transport mechanism may have a transport roller that is rotated to transport the recording medium in the transport direction, and the pressing member may be provided on the upstream side of the transport direction from the transport roller. Accordingly, since the transport roller is positioned in the vicinity of the recording position, so that it is possible to achieve a decrease in side of the apparatus.

The transport mechanism may have a transport roller that is rotated to transport the recording medium in the transport direction, and the pressing member may be provided between a recording position on the downstream side of the transport direction from the transport roller and the transport roller. Accordingly, the guide can guide the recording medium at a position close to the recording position, so that it is possible to enhance the precision in the recording position.

A length in the transport direction of the guide may be shorter than a length in the transport direction of the recording medium. Accordingly, it is possible to achieve a decrease in the size of the apparatus.

An end surface in the transport direction of the guide is an inclined surface, and when the upper end of the recording medium being transported toward the guide comes in contact with the inclined surface, the inclined surface may guide the upper end toward a side where the convex portion of the guide is formed. Accordingly, the recording medium is less likely to be jammed.

An end portion of the convex portion on the upstream side of the transport direction may be narrowed as it goes to the upstream side of the transport direction. Accordingly, the recording medium is less likely to become jammed.

The guide may have a plurality of the convex portions, and the plurality of the convex portions may extend at an interval which is an integer multiple of a lens pitch of the lenticular lens. Accordingly, it is possible to enhance the precision in the recording position with a simple configuration.

The guide may be used for guiding recording media with a plurality of sizes, and the convex portion may be formed at a position where the recording medium with the minimum size passes through. Accordingly, it is possible to enhance the precision in the recording position of a recording medium with any size.

When the recording medium having the lenticular lens is to be recorded, the recording medium may be transported to pass through a portion where the convex portion is formed, and when a recording medium without a lenticular lens is to be recorded, the recording medium may be transported to pass through a portion where the convex portion is not formed. Accordingly, a mark from the convex portion does not remain on the recording medium without the lenticular lens.

A transport method includes: allowing a convex portion formed along a transport direction to come in contact with a lenticular lens of a recording medium having the lenticular lens; and transporting the recording medium in the transport direction while allowing the convex portion to come in contact with the lenticular lens. In the recording method, it is possible to enhance precision in a recording position with a simple configuration.

Lens Sheet

First, a lens sheet which is a recording medium having a lenticular lens will be described.

Figure 1B:
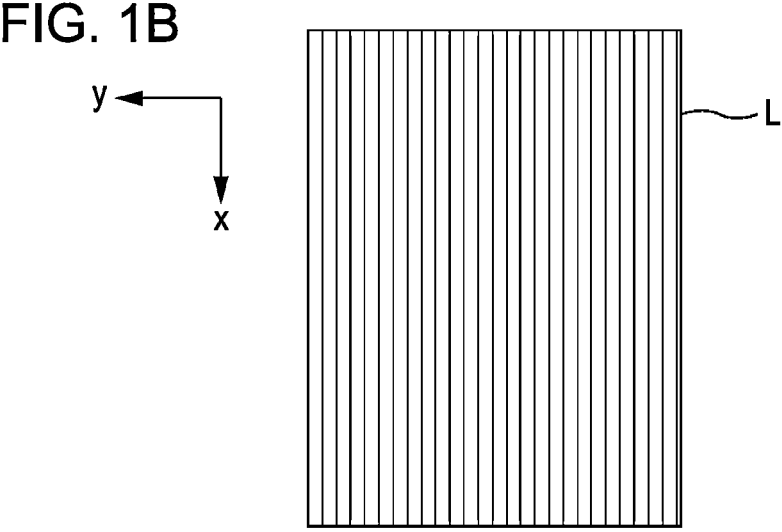
FIG. 1B is a view of the lens sheet viewed from a lenticular lens.
Figure 1C:
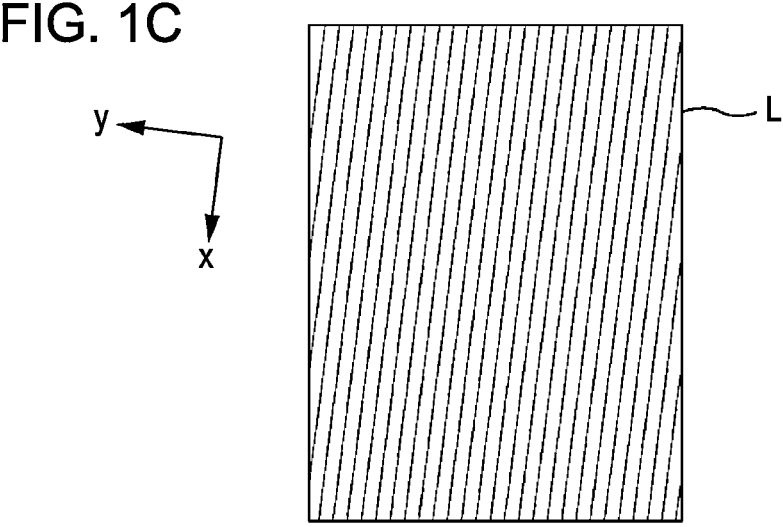
FIG. 1C is an explanatory view of another lens sheet.

FIG. 1A is an enlarged cross-sectional view of a lens sheet, FIG. 1B is a view of the lens sheet viewed from a lenticular lens, and FIG. 1C is an explanatory view of another lens sheet.

The lens sheet L includes a lenticular lens 7 and an image formation layer 8.

The lenticular lens 7 is an optical member (cylindrical lens array) made of resin, which is formed by arranging a number of cylindrical lenses 13 in a sheet surface direction. In the following description, a generatrix direction of the cylindrical lens 13 is referred to as the "x direction", and a direction in which the cylindrical lens 13 extends is referred to as the "y direction" (x and y are lowercase letters). In addition, a portion of each cylindrical lens 13 which protrudes most may be called a "peak", a convex portion between the cylindrical lenses may be called a "valley", a line connecting the peaks may be called a "ridge", and the direction parallel to the ridge may be called the "generatrix direction".

The image formation layer 8 includes an ink transmission layer 8A and an ink absorption layer 8B. The ink transmission layer 8A is positioned on an outside of the lens sheet L, and the ink absorption layer 8B is interposed between the ink transmission layer 8A and the lenticular lens 7. When an image is recorded from a side of the image formation layer 8 of the lens sheet L in an ink jet recording method, ink transmits the ink transmission layer 8A and is absorbed by the ink absorption layer 8B, so that the image is recognizable through the lenticular lens 7.

The image formation layer 8 of the lens sheet L may not be included. For example, when an ultraviolet curable ink is used, an image can be directly recorded on the rear side of the lenticular lens 7 without the ink transmission layer 8A or the ink absorption layer 8B.

A recording apparatus according to this embodiment described later transports the lens sheet L along the generatrix direction (x direction) of the lenticular lens 7 using a shape of the lenticular lens 7. Specifically, convex portions are provided on a guide (described later) along a transport direction, and the lens sheet L is transported to slide as the convex portions are engaged with the valleys between the cylindrical lenses, so that the transport direction of the recording apparatus and the generatrix direction (x direction) of the lens are aligned with each other.

Accordingly, with regard to a recording position (a position at which a head ejects ink to form an image) of the recording apparatus, the position of each cylindrical lens 13 of the lenticular lens 7 is determined to a predetermined position. As a result, it is possible to record an image with good precision in a lens array of the lenticular lens 7.

In FIG. 1B, a direction of a side of the lens sheet L is aligned with the x direction or the y direction. Here, as illustrated in FIG. 1C, there may be a case where a direction of a side of a lens sheet L is not aligned with the x direction or the y direction due to a type of the lens sheet L or manufacturing precision of the lens sheet L. The recording apparatus of this embodiment can align the lens sheet L as illustrated in FIG. 1C with the transport direction of the recording apparatus or the generatrix direction (x direction) of the lens, thereby recording an image in the lens array of the lenticular lens 7 with good precision.

Even in the case as illustrated in FIG. 1B, next to the lens sheet L, the peak of the cylindrical lens 13 may be positioned, or the valley thereof may be positioned. In the recording apparatus of this embodiment, regardless of whether the peak or the valley of the cylindrical lens 13 is positioned at the side of the lens sheet L, the position of each cylindrical lens 13 of the lenticular lens 7 is disposed to the predetermined position.

Embodiment

Overview of Recording Apparatus

Figure 2:
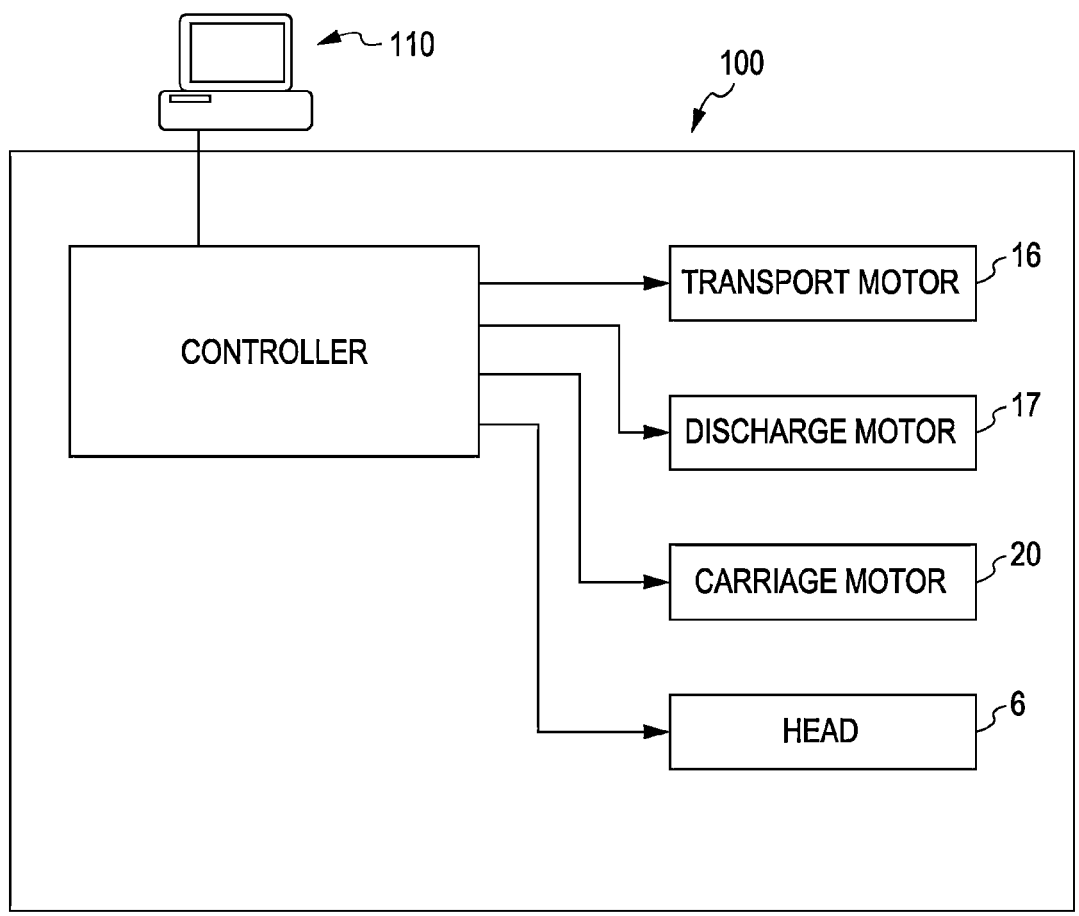
FIG. 2 is a block diagram for explaining a schematic configuration of a recording apparatus.
Figure 3:
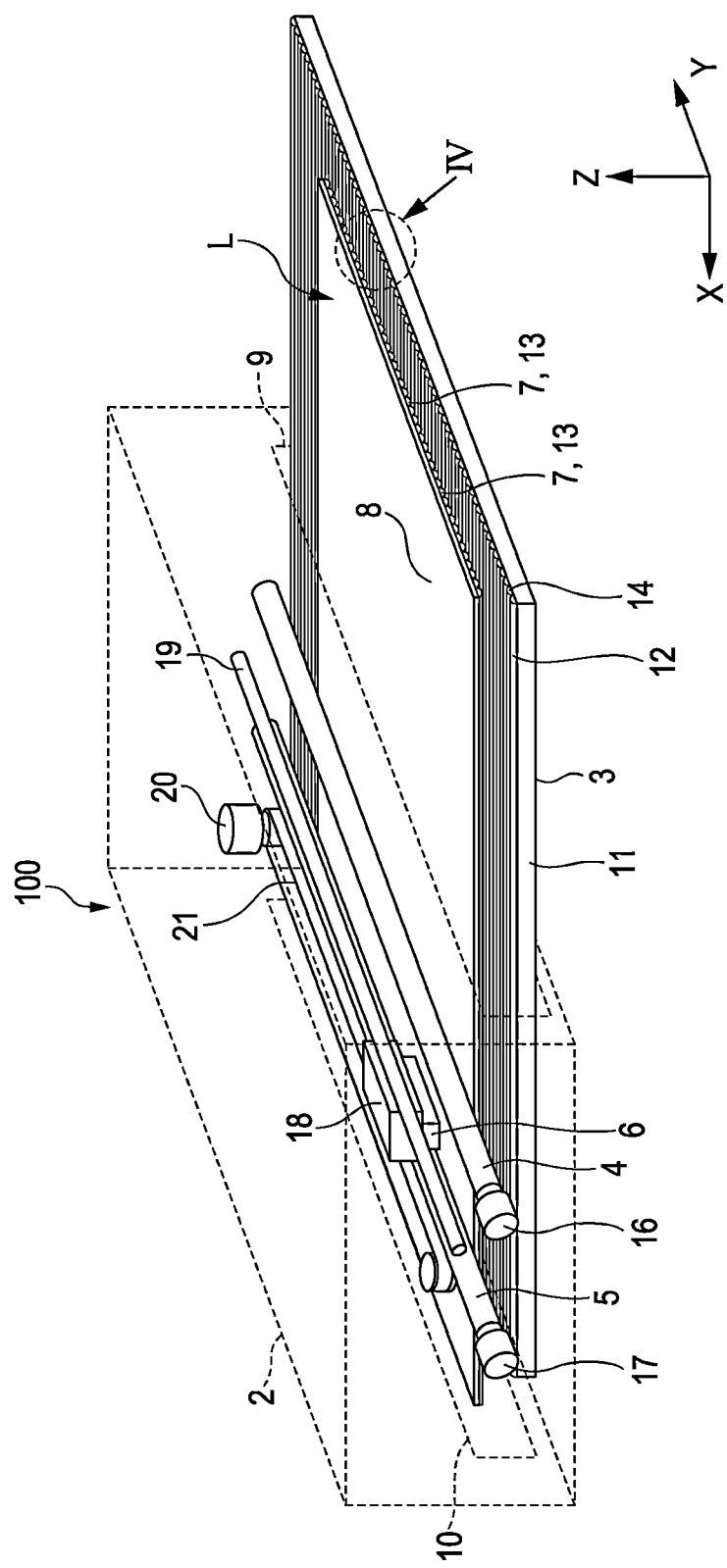
FIG. 3 is a rear perspective view of the recording apparatus.

FIG. 2 is a block diagram for explaining a schematic configuration of a recording apparatus. FIG. 3 is a rear perspective view of the recording apparatus. In FIG. 3, a transport direction of the recording apparatus 100 is referred to as the X direction, a main scanning direction of a head is referred to as the Y direction, and a vertical direction is referred to as the Z direction (X, Y, and Z are uppercase letters). As described later, the X direction (the transport direction of the recording apparatus 100) and the x direction (the generatrix direction of the lens of the lens sheet L) are aligned with each other.

A computer 110 which is an external apparatus generates an image to be recorded by the recording apparatus 100 and transmits data for recording to the recording apparatus 100. In a case where recording is performed on the lens sheet L, the computer 110 generates an image for recording by processing and synthesizing a plurality of images designated by a user according to a lens pitch or the like and transmits data for recording to perform recording on the image to the recording apparatus 100. Otherwise, the recording apparatus 100 may have a function of generating the data for recording.

The recording apparatus 100 performs recording on a medium on the basis of the data for recording which is received from the computer 110. In the case where recording is performed on the lens sheet L, the image is recorded on a rear side of the lens sheet L on the basis of the data for recording which is generated according to the lens pitch.

The recording apparatus 100 includes a housing 2, a guide 3, a transport roller 4, a discharge roller 5, a head 6, and the like. The housing 2 is an outercasing member of the recording apparatus 100. The guide 3 supports the lens sheet L and guide the lens sheet L in the transport direction. The transport roller 4 and the discharge roller 5 transport the lens sheet L placed on the guide 3 in the transport direction. The head 6 performs records on the lens sheet L.

The housing 2 is provided with a feed opening portion 9 and a discharge opening portion 10. The lens sheet L supplied from the feed opening portion 9 is transported by the transport roller 4 and the discharge roller 5 in the transport direction, is subjected to the recording by the head 6, and is discharged from the recording apparatus 100 through the discharge opening portion 10.

The guide 3 is placed under the transport roller 4 and the discharge roller 5, and the overall shape thereof shows a rectangular plate shape. The guide 3 has a length extending from a position protruding from the feed opening portion 9 to a position between the discharge opening portion 10 and the discharge roller 5 with respect to the transport direction. In addition, the guide 3 has a width for supporting the entire width of the lens sheet L with respect to the Y direction (or the width direction of the lens sheet L).

The transport roller 4 and the discharge roller 5 are disposed in the front and in the rear of the head 6, respectively. The transport roller 4 is a roller for transporting the lens sheet L supplied from the feed opening portion 9 to a recording position (a position at which the head 6 performs recording). The discharge roller 5 is a roller for discharging the lens sheet L subjected to the recording at the recording position to the discharge opening portion 10. The transport roller 4 is rotated by a transport motor 16, and the discharge roller 5 is rotated by a discharge motor 17.

The head 6 is a recording head in an ink jet type for ejecting ink and mounted to a lower surface of a carriage 18. The carriage 18 is supported to move in the Y direction by a carriage guide 19 provided along the Y direction and is fixed to a timing belt 21 driven by a carriage motor 20. Accordingly, when the timing belt 21 is rotated by the carriage motor 20, the head 6 is reciprocated in the Y direction along with the carriage 18.

A controller controls transportation of the lens sheet L in the transport direction by controlling the transport motor 16 and the discharge motor 17. In addition, the controller controls movement of the head 6 by controlling the carriage motor 20. In addition, the controller controls ejection of ink from the head 6. Accordingly, the controller can record an image on the lens sheet L at a desired position. In addition, when recording is to be performed on the lens sheet L, the lens sheet L is placed on the guide 3 so that a side of the image formation layer 8 is opposed to the head 6 and a side of the lenticular lens 7 comes in contact with the guide 3. Accordingly, the head 6 performs recording on the image formation layer 8 such that the image recorded on the image formation layer 8 is recognizable from the side of the lenticular lens 7, thereby manufacturing a recorded product.

Configuration of Guide

Figure 4:
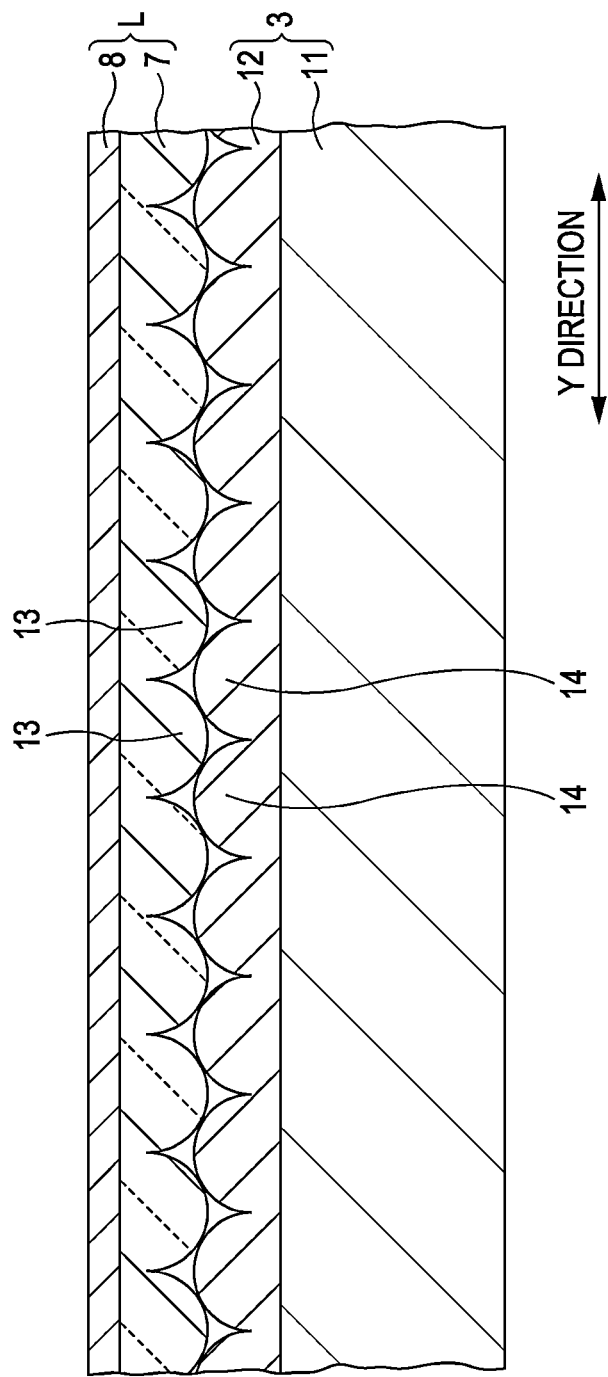
FIG. 4 is an enlarged view of a portion IV shown in FIG. 3.

FIG. 4 is an enlarged view of a portion IV shown in FIG. 3.

The guide 3 includes a plate-shaped substrate 11 and an engagement portion 12. The engagement portion 12 has the same shape as the lenticular lens 7 and is provided on the substrate 11. That is, convex portions 14 striated in the same pattern as that of the cylindrical lenses 13 extend at the same pitch as the lens pitch. For this reason, the engagement portion 12 may be formed by turning the lenticular lens 7 over. Since the shape of the engagement portion 12 is the same as the lenticular lens 7, here, a portion of the convex portion 14 of the engagement portion 12 which protrudes most may be called a "peak", a concave portion between the convex portions 14 may be called a "valley", a line connecting the peaks may be called a "ridge", and a direction parallel to the ridge may be called a "generatrix direction".

The guide 3 is mounted in the recording apparatus 100 so that a position thereof is adjusted to align the generatrix direction of the striated convex portion 14 with the transport direction (X direction) of the recording apparatus 100. In addition, the striated convex portions 14 are arranged side by side across the width greater than the width of the lens sheet L.

Since the engagement portion 12 has the same shape as the lenticular lens 7, when the lens sheet L is placed on the guide 3 so that the side of the lenticular lens 7 faces down, the cylindrical lenses 13 of the lenticular lens 7 are engaged with the convex portions 14 of the guide 3. Therefore, the convex portion 14 of the guide 3 is positioned between the peaks of the cylindrical lenses 13, and the peak of the cylindrical lenses 13 is positioned between the convex portions 14 of the guide 3. As a result, the movement of the lens sheet L in the Y direction is limited with respect to the guide 3, so that the position thereof is determined in the Y direction. On the other hand, there is no limitation to the movement of the convex portion 14 in the generatrix direction (a direction perpendicular to the plane of FIG. 4, that is, X direction), so that the lens sheet L can be transported along the transport direction which is the generatrix direction of the convex portion 14 of the guide 3. That is, the guide 3 guides the lens sheet L in the transport direction while restricting the movement in the Y direction of the lens sheet L.

Skew Prevention by Pressing Force

There may be a case where the lens sheet L is placed on the guide 3 obliquely. That is, there may be a case where the lens sheet L is placed on the guide 3 in a state where the transport direction (X direction) of the recording apparatus 100 and the generatrix direction (x direction) of the lens of the lens sheet L are not aligned with each other. In this state, the position of the lens sheet L is not determined in the Y direction. However, even in this case, the lens sheet L is transported while pressing the guide 3, so that it is possible prevent the lens sheet L from skewing while being transported.

Two lens sheets are prepared, and at first, lens faces thereof are overlapped to face each other in a state (in a state where peaks of lenses are not engaged with each other) where generatrix directions of the two lens sheets are disposed to intersect with each other. Then, in this state, when the two lens sheets are slipped (rubbed together), the generatrix directions of the two lens sheets are aligned with each other, and thus the peaks of the lenses are engaged with each other. By using this phenomenon, skew prevention is performed as the recording apparatus 100 of this embodiment transports the lens sheet L while pressing it on the guide 3 is achieved.

Figure 5A:
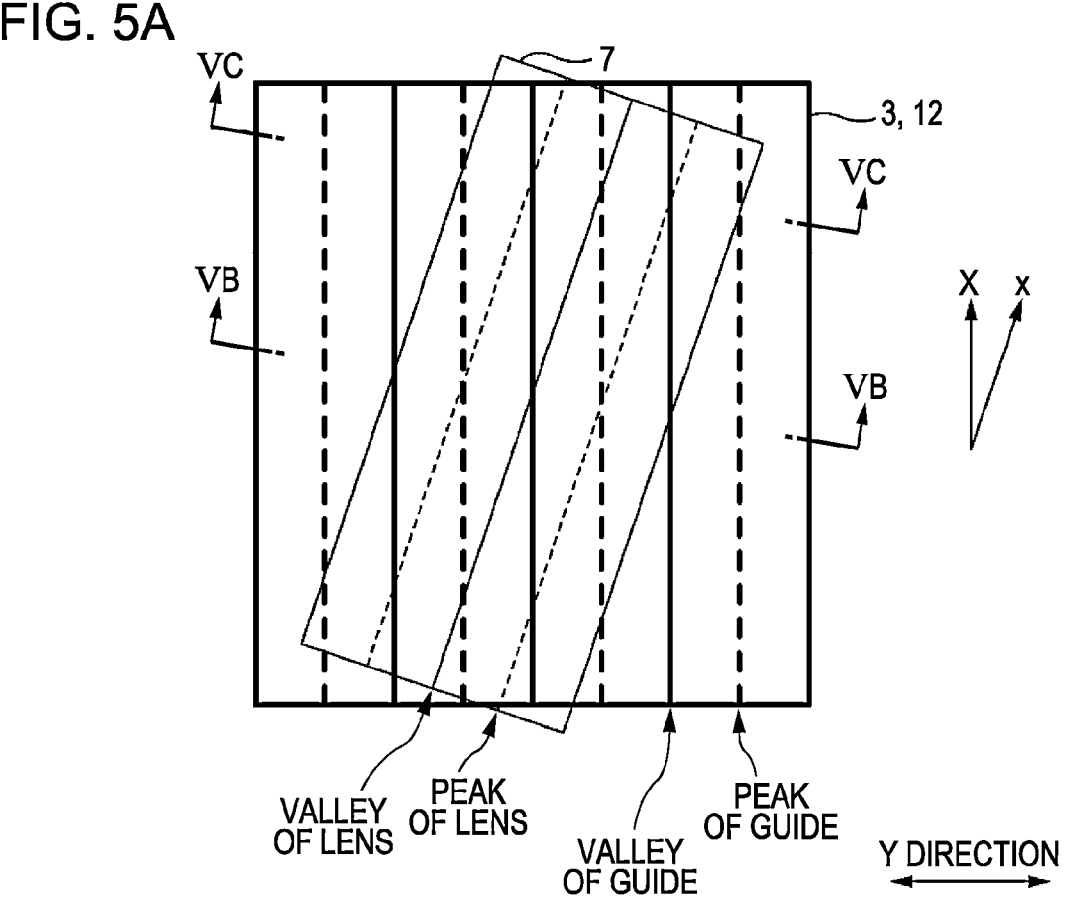
FIG. 5A is a top plan view of a lens sheet which is placed obliquely with respect to a guide.
Figure 5B:
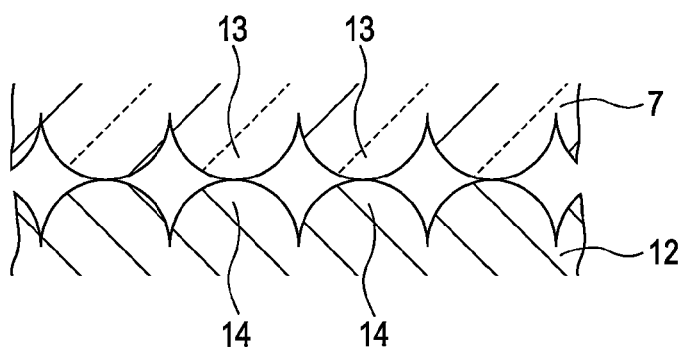
FIG. 5B is a cross-sectional view taken along the line VB-VB of FIG. 5A.
Figure 5C:
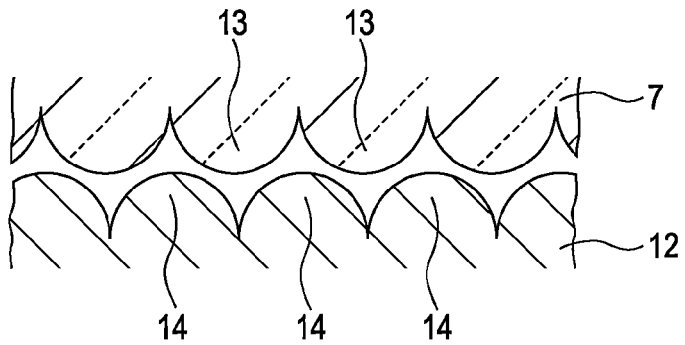
FIG. 5C is a cross-sectional view taken along the line VC-VC of FIG. 5A.

FIG. 5A is a top plan view of a lens sheet which is placed obliquely with respect to the guide 3, FIG. 5B is a cross-sectional view taken along the line VB-VB of FIG. 5A, and FIG. 5C is a cross-sectional view taken along the line VC-VC of FIG. 5A. In FIG. 5A, the positions of the peaks of the guide 3 and the lens are shown by dotted lines, the positions of the valleys thereof are shown by full lines, the guide 3 is shown by thick lines, and the lens is shown by thin lines. For the convenience of the description, the number of peaks or valleys is reduced.

When the lens sheet L is disposed obliquely with respect to the guide 3 as illustrated in FIG. 5A, in some areas, the peaks of the lens sheet L and the guide 3 may come in contact with each other as illustrated in FIG. 5B. Therefore, as compared with the state of FIG. 4, the gap between the lens sheet L and the guide 3 is large. Accordingly, as illustrated in FIG. 5C, portions where the peak of the lens sheet L is spaced from the guide 3 occur. When a pressing force is exerted on a position of the VC-VC cross-section of the state of FIG. 5C, the lens sheet L is bent so that the peak of the lens sheet L is fitted into the valley of the guide 3 as illustrated in FIG. 4. As a result, when the pressing force is exerted on the position of the VC-VC cross-section, the movement in the left and right direction (Y direction) of the lens sheet L is limited at the position of the VC-VC cross-section.

When the lens sheet L is transported in the transport direction in this state, a position where the pressing force is exerted deviates from the position of the VC-VC cross-section. As a result, even at the position deviating from the VC-VC cross-section, as illustrated in FIG. 4, the peak of the lens sheet L is fitted into the valley of the guide 3. Here, while the state as illustrated in FIG. 4 is maintained at the position of the VC-VC cross-section, in order to achieve the state as illustrated in FIG. 4 at the position deviating from the VC-VC cross-section, at a position (see FIGS. 5A and 5B) where the peak of the lens sheet L and the peak of the guide 3 come in contact with each other as illustrated by the VB-VB cross-section, the peak of the lens sheet L slips along the valley of the guide 3 (in this case, the peak of the lens sheet L slips to the right). Accordingly, the lens sheet L is rotated toward a direction (the counterclockwise direction in FIG. 5A) to solve skewing, thereby correcting skewing (the generatrix direction of the lens sheet L is aligned with the generatrix direction of the guide 3).

When skewing is corrected and the peak of the lens sheet L and the peak of the guide 3 are engaged with each other once, the rotational movement of the lens sheet L is already restricted, and a force exerted in a rotation direction relative to the lens sheet L does not occur. In addition, when a pressing force is exerted on the lens sheet L in the state where the peak of the lens sheet L and the peak of the guide 3 are engaged with each other, the gap between the lens sheet L and the guide 3 does not become empty, and the movement of the lens sheet L with respect to the guide 3 is limited only to the X direction, thereby continuously preventing skewing.

Figure 6A:
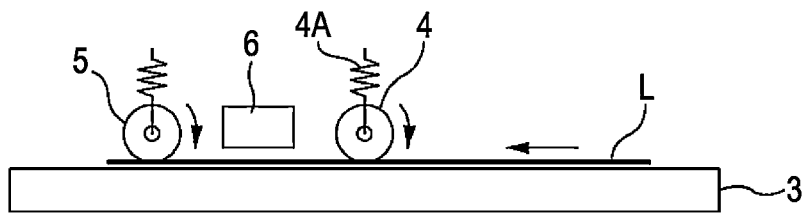
FIG. 6A is a schematic explanatory view of an arrangement of the guide of FIG. 3.

In this embodiment, the transport roller 4 transports the lens sheet L while pressing it on the guide 3 with a spring element (a spring element 4A of FIG. 6A). Accordingly, skewing of the lens sheet L is prevented, so that the X direction (the transport direction of the recording apparatus 100) is aligned with the x direction (the generatrix direction of the lens of the lens sheet L). In addition, in this embodiment, the discharge roller 5 also transports the lens sheet L while pressing it on the guide 3 with a spring element. Accordingly, even though a rear end of the lens sheet L passes through a position of the transport roller 4, skewing of the lens sheet L is continuously prevented, so that the X direction and the x direction are aligned with each other.

Modified Examples of Guide

About Displacement

FIG. 6A is a schematic explanatory view of an arrangement of the guide of FIG. 3. The above-mentioned guide 3 has a length extending from the position protruding from the feed opening portion 9 to the position between the discharge opening portion 10 and the discharge roller 5 with respect to the transport direction.

However, the arrangement of the guide 3 is not limited to this configuration. Hereinafter, modified examples of the arrangement of the guide 3 will be described.

Figure 6B:
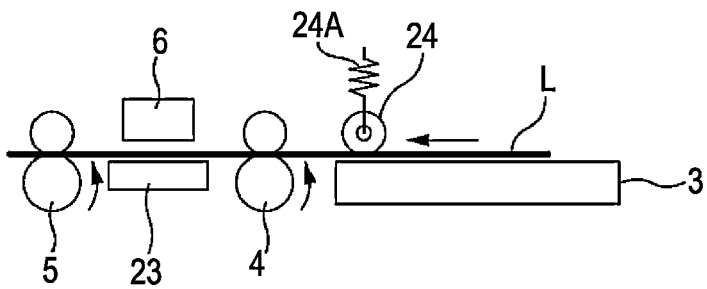
FIG. 6B is an explanatory view of an arrangement of a guide of a first modified example.

FIG. 6B is an explanatory view of an arrangement of a guide of a first modified example. This guide 3 has a length extending from the position protruding from the feed opening portion 9 only to a position immediately in front of the transport roller 4 with respect to the transport direction. Even with regard to the guide 3, since the lens sheet L is transported while the position of the lens sheet L is determined by the convex portion 14 formed along the transport direction, skewing of the lens sheet L is prevented, and the X direction (the transport direction of the recording apparatus 100) and the x direction (the generatrix direction of the lens of the lens sheet L) are aligned with each other. In addition, in this modified example, since the guide 3 has the length extending only to the position in front of the transport roller 4, a pressing roller 24 which is different from the transport roller 4 is provided, and the pressing roller 24 presses the lens sheet L against the guide 3 with a spring element 24A. As described above, the pressing roller 24 for pressing the lens sheet L against the guide 3 may not need to be used as the transport roller 4.

In addition, in FIG. 6A, the guide 3 supports the lens sheet L at a position opposed to the head 6. However, in FIG. 6B, a platen 23 is provided in addition to the guide 3 in order to support the lens sheet L at the position opposed to the head 6.

Figure 6C:
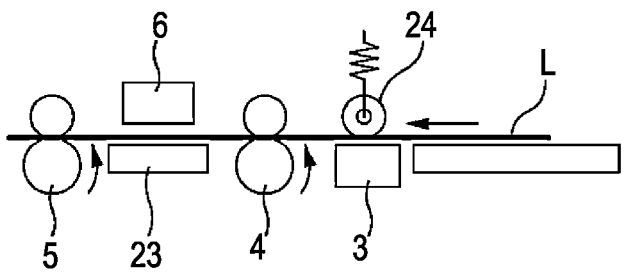
FIG. 6C is an explanatory view of an arrangement of a guide of a second modified example.

FIG. 6C is an explanatory view of an arrangement of a guide of a second modified example. This guide 3 does not exist at the position protruding from the feed opening portion 9 and is provided at a position opposed to the pressing roller 24. This guide 3 has a shortened length in the transport direction.

Figure 6D:
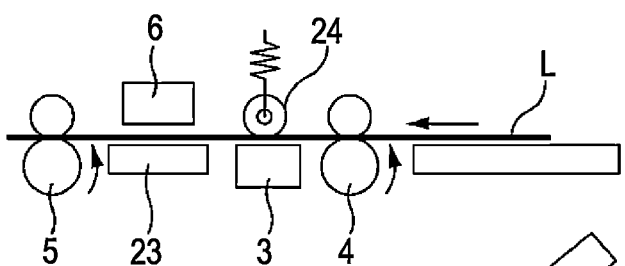
FIG. 6D is an explanatory view of an arrangement of a guide of a third modified example.

FIG. 6D is an explanatory view of an arrangement of a guide of a third modified example. This guide 3 is provided between the transport roller 4 and the head 6 with respect to the transport direction. In other words, the guide 3 is provided between the transport roller 4 and the platen 23 with respect to the transport direction. Even this guide 3 can guide the lens sheet L transported from the transport roller 4 while determining the position of the lens sheet L, so that skewing of the lens sheet L is prevented, and the X direction (the transport direction of the recording apparatus 100) and the x direction (the generatrix direction of the lens sheet L) are aligned with each other.

In addition, in the configuration of FIG. 6D, as compared with the configuration of FIG. 6C, since the guide 3 guides the lens sheet L at a position close to the recording position, the guide 3 can determine the position of the lens sheet L to the recording position with good precision. In the configuration of FIG. 6C, the transport roller 4 which is rotated by the transport motor 16 is provided near the recording position, so that a decrease in the size of the apparatus can be achieved.

Figure 6E:
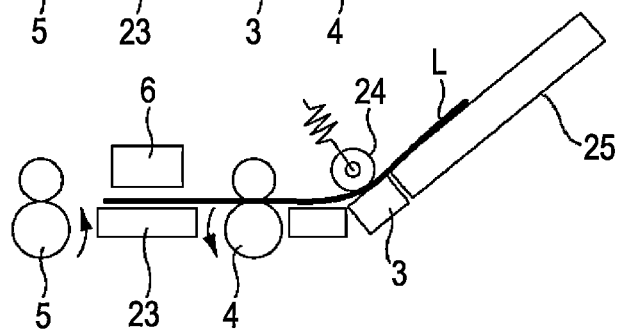
FIG. 6E is an explanatory view of an arrangement of a guide of a fourth modified example.

FIG. 6E is an explanatory view of an arrangement of a guide of a fourth modified example. A feeding portion 25 accommodates a number of lens sheets L stacked. The guide 3 may be provided on a feeding path between the feeding portion 25 and the transport roller 4. In the figure, the guide 3 is provided immediately in the rear of the feeding portion 25. Even when the guide 3 guides the lens sheet L at this position, skewing of the lens L is prevented, and it is possible to align the X direction (the transport direction of the recording apparatus 100) and the x direction (the generatrix direction of the lens of the lens sheet L) with each other.

Figure 6F:
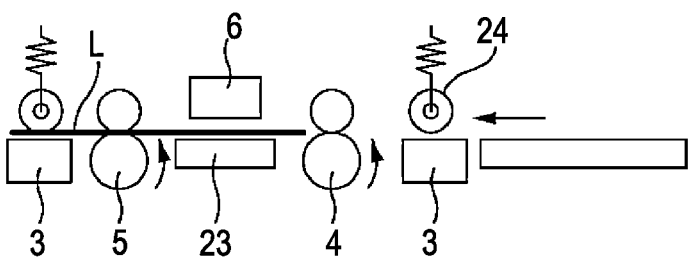
FIG. 6F is an explanatory view of an arrangement of a guide of a fifth modified example.

FIG. 6F is an explanatory view of an arrangement of a guide of a fifth modified example. As described above, the guide 3 may be provided on the downstream side of the transport direction from the head 6. When the guide 3 is provided at this position, the guide 3 can guide the lens sheet L even after the rear end of the lens sheet L passes through the transport roller 4.

About Shape of Engagement Portion (1)

Figure 7A:
FIG. 7A is an explanatory view of a cross-sectional shape of an engagement portion of the guide of FIG. 3.

FIG. 7A is an explanatory view of a cross-sectional shape of the engagement portion of the guide of FIG. 3. The above-mentioned guide 3 has the same shape as the lenticular lens 7.

Here, the engagement portion 12 of the guide 3 is not limited to the shape. Hereinafter, modified examples of the shape of the engagement portion 12 of the guide 3 will be described. In addition, any engagement portion 12 described later has the convex portion 14 along the transport direction as illustrated in FIG. 7A.

Figure 7B:
FIG. 7B is an explanatory view of a cross-sectional shape of an engagement portion of a first modified example.

FIG. 7B is an explanatory view of a cross-sectional shape of an engagement portion of a first modified example. The cross-sectional shape of the engagement portion 12 of the first modified example is opposite to the shape of the lenticular lens 7. In other words, the convex portion 14 of the engagement portion 12 of the first modified example has a shape corresponding to the concave portion of lenticular lens 7. Accordingly, center of curvature of the convex portion 14 in FIG. 7A is inside (lower side) the engagement portion 12, however, center of curvature of the convex portion 14 of the engagement portion 12 of the first modified example is outside (upper side) the engagement portion 12. The engagement portion 12 of the first modified example can strengthen the restriction of the lens sheet L in the Y direction.

Figure 7C:
FIG. 7C is an explanatory view of a cross-sectional shape of an engagement portion of a second modified example.

FIG. 7C is an explanatory view of a cross-sectional shape of an engagement portion of a second modified example. The engagement portion 12 of the second modified example does not have a curved surface, and the cross-section of the convex portion 14 is a triangular. Even by the shape, the lens sheet L can be restricted in the Y direction.

Figure 7D:
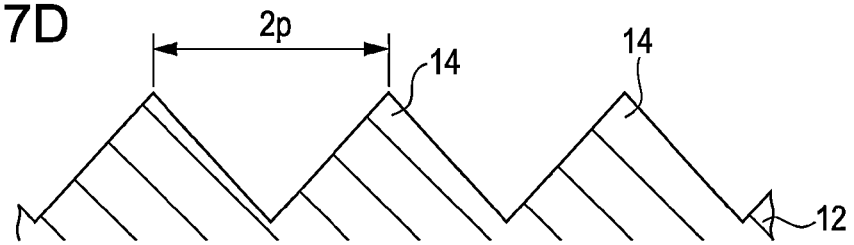
FIG. 7D is an explanatory view of a cross-sectional shape of an engagement portion of a third modified example.

FIG. 7D is an explanatory view of a cross-sectional shape of an engagement portion of a third modified example. The engagement portion 12 of the third modified example has an interval between the convex portions 14, which is twice as illustrated in FIGS. 7A to 7C. As described above, even in the case where pitches between the convex portion 14 are integer multiples of the lens pitch p, the convex portion 14 of the guide 3 is positioned at the valley of the cylindrical lens 13 when the lens sheet L is placed on the guide 3, so that the movement in the Y direction of the lens sheet L is limited by the guide 3, thereby determining the position of the lens sheet L in the Y direction.

Figure 7E:
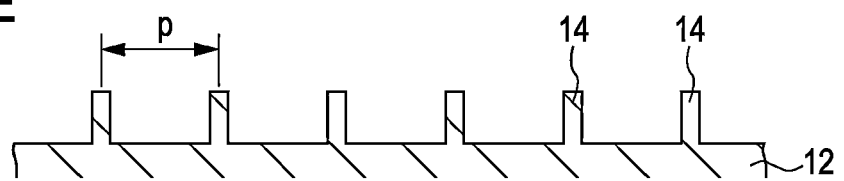
FIG. 7E is an explanatory view of a cross-sectional shape of an engagement portion of a fourth modified example.

FIG. 7E is an explanatory view of a cross-sectional shape of an engagement portion of a fourth modified example. In the engagement portion 12 of the third modified example, the convex portion 14 has a rectangular cross-section. Even in this shape, the lens sheet L can be restricted in the Y direction. Here, the engagement portions 12 illustrated in FIGS. 7A to 7D are less likely to cause gaps between the lenses as compared with the engagement portion 12 illustrated in FIG. 7E and thus have high position determination precision.

About Shape of Engagement Portion (2)

Figure 8A:
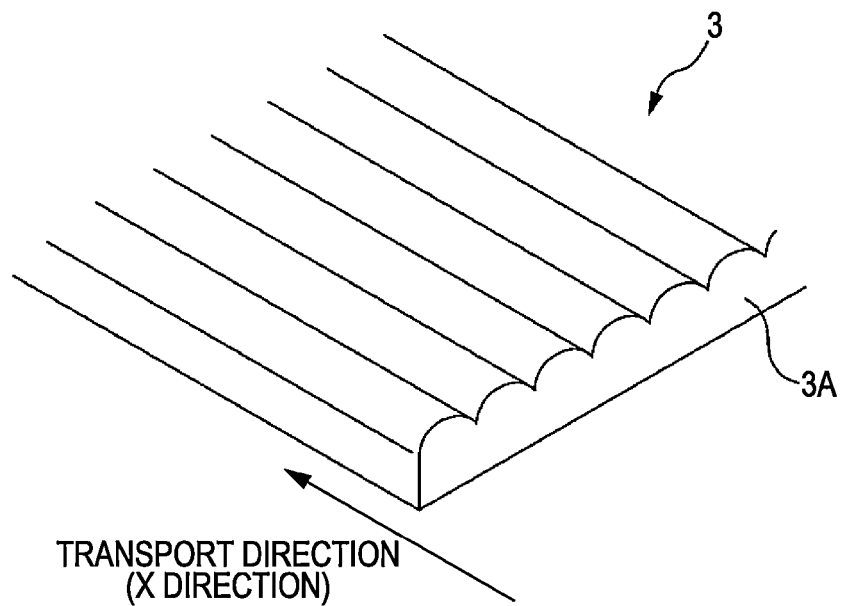
FIG. 8A is an explanatory view of an end surface on the upstream side of a transport direction of the guide of FIG. 3.

FIG. 8A is an explanatory view of an end surface on the upstream side of a transport direction of the guide of FIG. 3. As illustrated in FIG. 8A, in the case where a normal direction of the end surface 3A of the guide 3 is the transport direction (X direction), when the lens sheet L is transported toward the guide 3, an upper end of the lens sheet L runs against the end surface 3A of the guide 3 and the sheet L is more likely to be jammed.

Figure 8B:
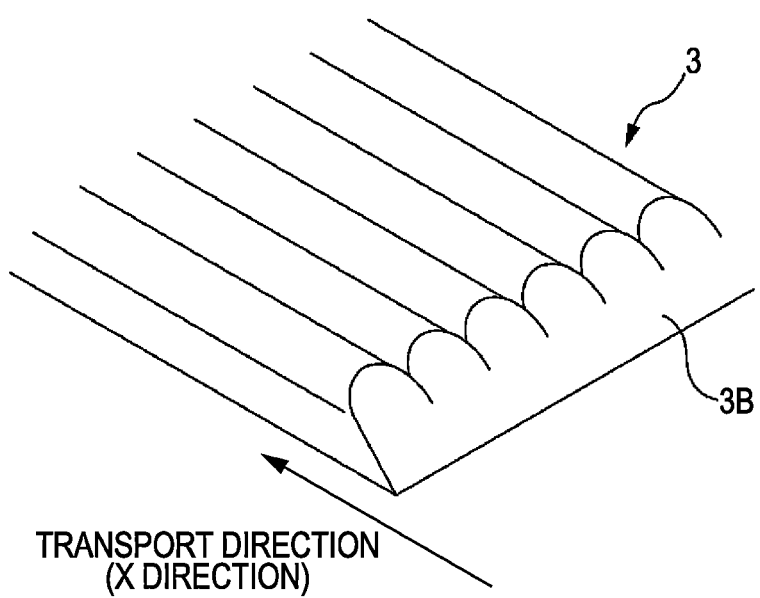
FIG. 8B is an explanatory view of a modified example of a shape of the end surface of the guide.

FIG. 8B is an explanatory view of a modified example of a shape of the end surface of the guide. In this modified example, the end surface of the guide 3 is an inclined surface such that a normal direction of the end surface 3B of the guide 3 on the upstream side of the transport direction has a Z direction component. Accordingly, when the upper end of the lens sheet L runs against the end surface 3B of the guide 3, the upper end of the lens sheet L is guided upwardly, so that the sheet is less likely to be jammed.

In addition, as described above with reference to FIGS. 6C to 6F, in the configuration in which the lens sheet L is transported from the upstream side of the transport direction from the guide 3, the modified example illustrated in FIG. 8B is more advantageous.

About Shape of Engagement Portion (3)

Figure 9A:
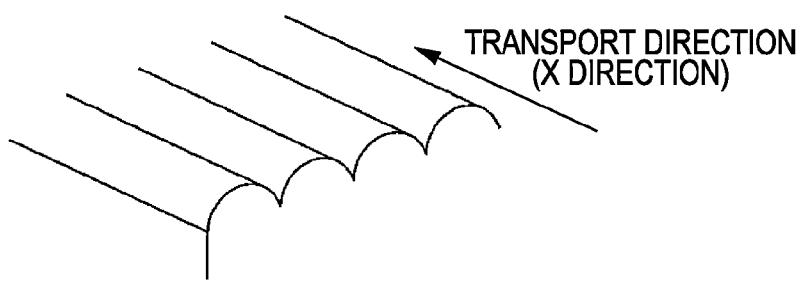
FIG. 9A is an explanatory view of a shape of an end portion of the engagement portion of the guide of FIG. 3, and FIGS. 9B to 9E are explanatory views of modified examples of shapes of end portions of convex portions of engagement portions.
Figure 9B:
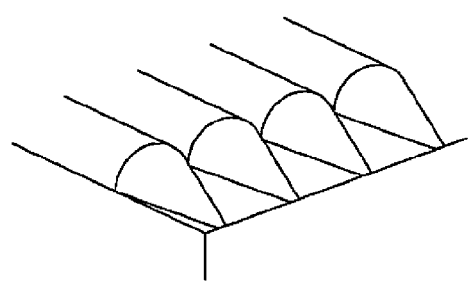
Figure 9C:
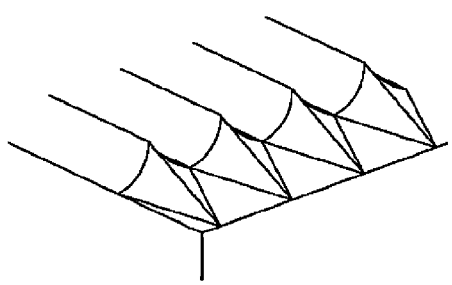
Figure 9D:
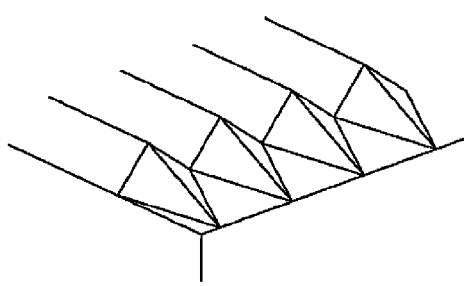
Figure 9E:
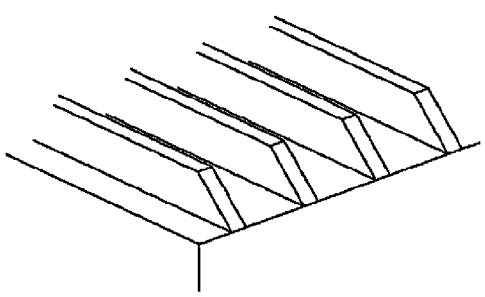

FIG. 9A is an explanatory view of a shape of an end portion of the engagement portion of the guide of FIG. 3. As illustrated in FIG. 9A, in a case where the cross-sectional shape of the engagement portion 12 is uniform as it goes to the end portion, when the lens sheet L is transported toward the guide 3, the upper end of the lens sheet L runs against the convex portion 14 of the engagement portion 12 and the sheet is more likely to be jammed.

Therefore, as illustrated in FIG. 9B to 9E, the convex portion 14 of the engagement portion 12 may be narrowed toward the upstream side of the transport direction. Accordingly, the end of the convex portion 14 of the engagement portion 12 is easily inserted between the peaks of the lens sheets L transported and guides the peaks of the lens sheet L to the valley of the engagement portion 12, thereby easily guiding the valley of the lens sheet L to the peak of the engagement portion 12.

In addition, as described above with reference to FIGS. 6C to 6F, in the configuration in which the lens sheet L is transported from the upstream side of the transport direction from the guide 3, the modified examples illustrated in FIGS. 9B to 9E are more advantageous.

About Shape of Engagement Portion (4)

The above-mentioned convex portions 14 have shapes striated along the X direction (transport direction). However, the shape of the convex portion 14 is not limited to the striation.

Figure 10:
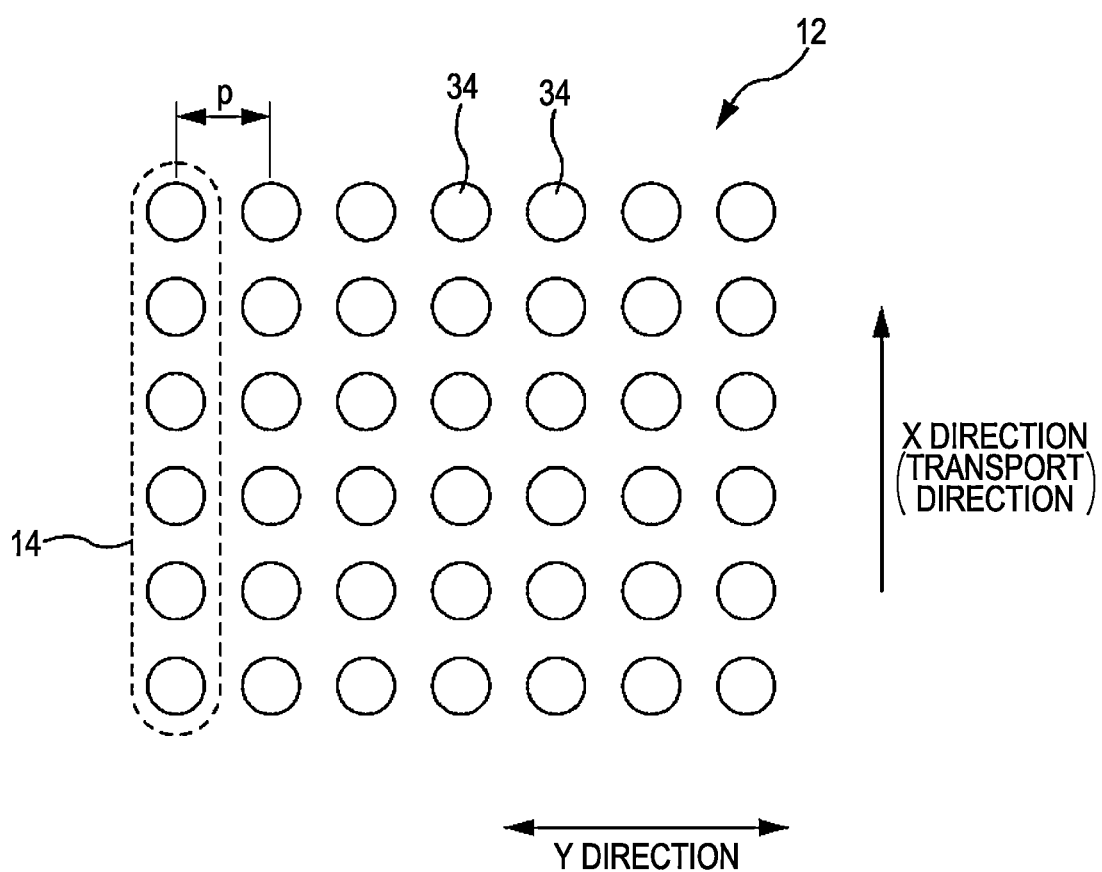
FIG. 10 is a top plan view of a part of a guide of a modified example.

FIG. 10 is a top plan view of a part of a guide of a modified example. A number of hemispherical protrusions are provided in the engagement portion 12 in a square lattice. An interval between the protrusions 34 is equal to the lens pitch p of the lenticular lens 7. In other words, in this modified example, a number of the protrusions 34 are provided along the transport direction, the convex portions 14 are formed along the transport direction, and the convex portions 14 extend at the same interval as the lens pitch p. Even by this guide 3, the lens sheet L can be transported in the X direction while being restricted in the Y direction.

In addition, the shape of the protrusion 34 in this modified example is hemispherical, however, may be conical or pyramidal. In addition, the interval between the protrusions in the Y direction may not necessarily be the same as the lens pitch p of the lenticular lens 7 and may be an integer multiple of the lens pitch. In addition, the protrusions 34 may not be aligned in the Y direction.

About the Number of Convex Portions

In the above-mentioned guide 3, a number of the convex portions 14 are sequentially provided in the Y direction at the same pitch as the lens pitch of the lenticular lens 7. However, the guide 3 may not have the shape.

Figure 11A:
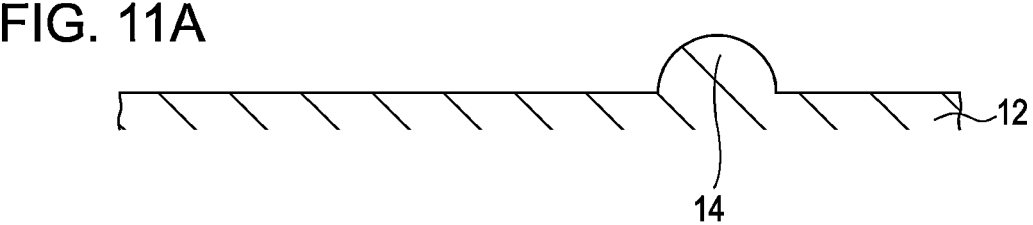
FIG. 11A is an explanatory view of a first modified example of the number of convex portions.

FIG. 11A is an explanatory view of a first modified example of the number of convex portions. As illustrated in FIG. 11A, even in a case where the convex portion 14 has a singular number, when the convex portion 14 is formed along the transport direction (in a direction perpendicular to the plane of FIG. 11A), the guide 3 can transport the lens sheet L in the transport direction while restricting it in the Y direction.

Figure 11B:
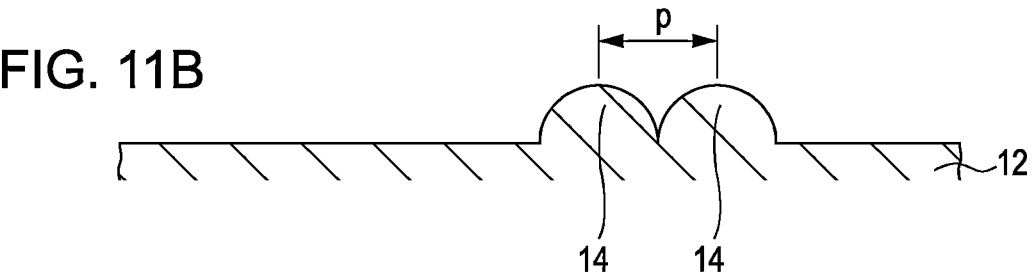
FIG. 11B is an explanatory view of a second modified example of the number of convex portions.

FIG. 11B is an explanatory view of a second modified example of the number of convex portions. As illustrated in FIG. 11B, a plurality of the convex portions 14 may extend at the same pitch as the lens pitch p of the lenticular lens 7.

Figure 11C:
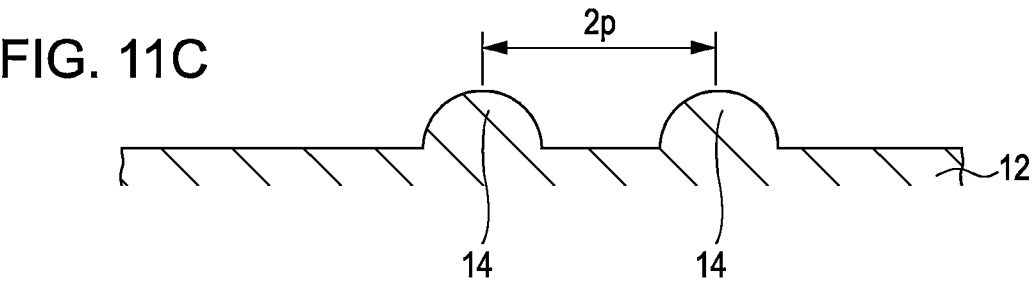
FIG. 11C is an explanatory view of a third modified example of the number of convex portions.

FIG. 11C is an explanatory view of a third modified example of the number of convex portions. As illustrated in FIG. 11C, a plurality of the convex portions 14 may extend at an interval which is an integer multiple of the lens pitch p of the lenticular lens 7.

Figure 11D:
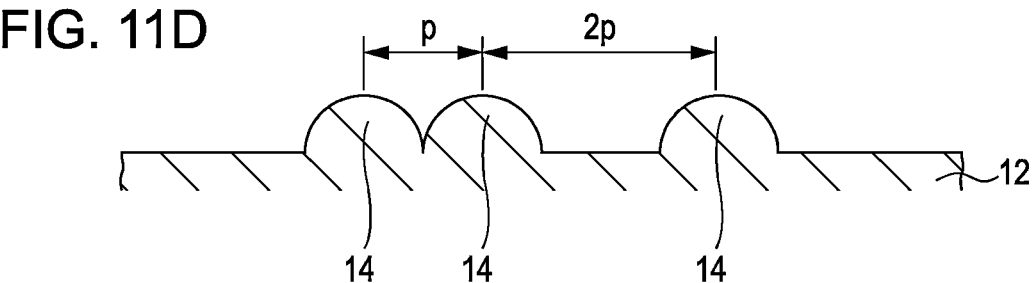
FIG. 11D is an explanatory view of a fourth modified example of the number of convex portions.

FIG. 11D is an explanatory view of a fourth modified example of the number of convex portions. In a case where a plurality of the convex portions 14 are provided in the guide 3, the interval therebetween does not need to necessarily be uniform, and the interval between the convex portions 14 may be the lens pitch p or integer multiples of the lens pitch p of the lenticular lens 7.

In addition, in FIGS. 11A to 11D, the shape of the convex portion 14 is cylindrical, however, may employ other shape as described above. Here, detailed description thereof will be omitted.

Formation Position of Convex Portion (1)

Figure 12A:
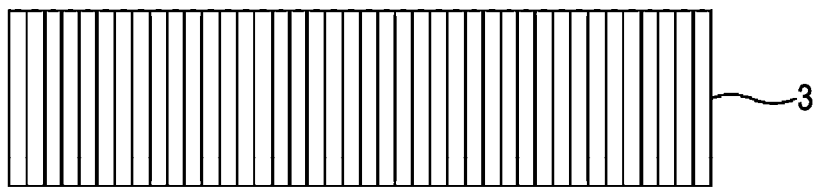
FIG. 12A is a top plan view of the guide of FIG. 6C.

FIG. 12A is a top plan view of the guide of FIG. 6C. The convex portion 14 is formed at a portion hatched vertically in FIG. 12A. The above-mentioned guide 3 is provided with the convex portions 14 over the entire surface of the guide 3. However, places where the convex portions 14 are provided may not need to necessarily be the entire surface of the guide 3.

Figure 12B:
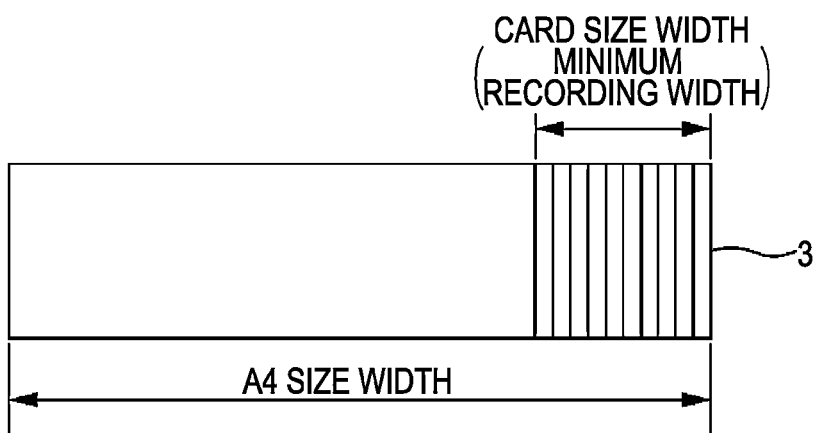
FIG. 12B is an explanatory view of a first modified example of a formation position of the convex portions.

FIG. 12B is an explanatory view of a first modified example of a formation position of the convex portions. In a case where a plurality of sizes of the lens sheet L on which the recording apparatus 100 can perform recording exist, the convex portion 14 may be formed in alignment with a minimum recording width. For example, in a case where recording is performed on the lens sheets L of card size to A4 size, the convex portion 14 may be formed at a position where the lens sheet L having the card size which is the minimum recording width passes. Accordingly, even though the lens sheet L with any size is transported, at least a part of the lens sheet L passes through the convex portion formation position, and skewing of the lens sheet L at that time is prevented.

In addition, in a configuration in which the recording apparatus 100 transports the lens sheet L so that a position of a right end of the lens sheet L with any size is the same, the convex portion 14 is formed at the position as illustrated in FIG. 12B. In a configuration in which the recording apparatus 100 transports the lens sheet L so that the center of the lens sheet L with any size is the same, the hatched portion of FIG. 12B may be at the center.

Figure 12C:
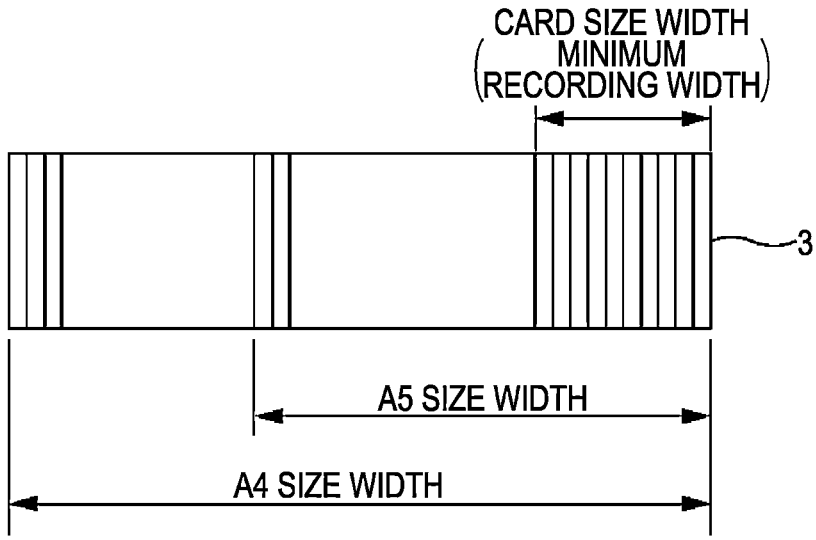
FIG. 12C is an explanatory view of a second modified example of the formation position of the convex portions.

FIG. 12C is an explanatory view of a second modified example of the formation position of the convex portions. In the case of FIG. 12B, the lens sheet L with A4 size is transported, a frictional force is exerted on the side where the convex portion 14 is formed during the transportation, it is difficult to transport the lens sheet L with good precision. Here, in this modified example, the convex portion 14 is formed on the left as well as on the right in the figure. Therefore, when the lens sheet L of A4 size is transported, the frictional force is exerted on both sides of the lens sheet L, thereby enabling the lens sheet L to be transported with good precision. In addition, the convex portion 14 may be formed in alignment with a position of a left end of each regular size during transportation so that the frictional force is exerted to both sides of the lens sheet L during the transportation of the lens sheets L with other regular sizes.

Formation Position of Convex Portion (2)

The recording apparatus 100 may perform recording on a paper in addition to the lens sheet L. When the recording apparatus 100 applies a pressing force to the paper on the guide 3, there is a concern that a mark from the convex portion 14 may remain on the paper. Particularly, in a case where the convex portion 14 is formed only on a part of the guide 3 (for example, in the case of the guide 3 illustrated in FIG. 11A or 12B), when a pressing force is applied to the paper, concentrated load is exerted on the paper, and there is a concern that marks from the convex portion 14 may remain on the paper.

Therefore, the position in the Y direction of the lens sheet L during the recording on the lens sheet L and the position in the Y direction of the paper during the recording on the paper may be changed.

Figure 13A:
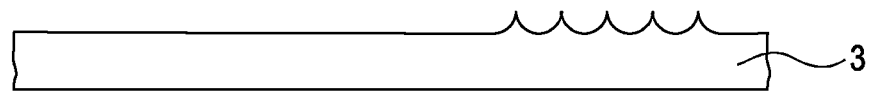
FIG. 13A is a view of the guide viewed in the transport direction.
Figure 13B:
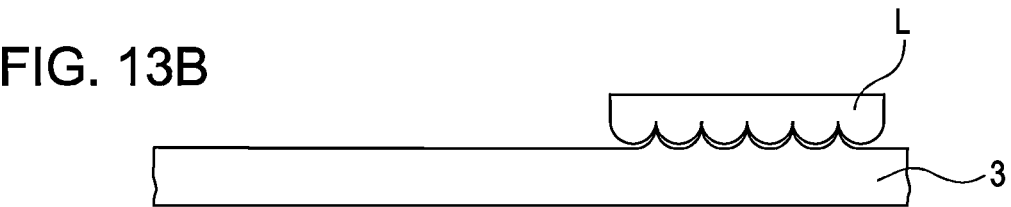
FIG. 13B is a schematic explanatory view of a transport position of the lens sheet.
Figure 13C:
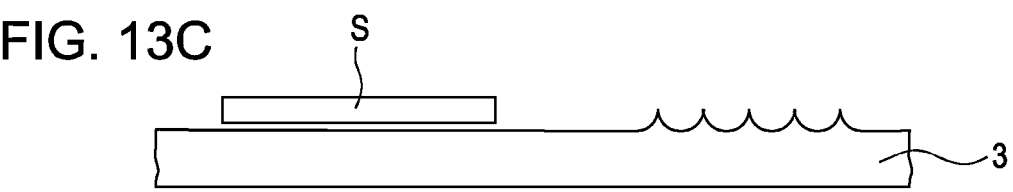
FIG. 13C is a schematic explanatory view of a transport position of a normal sheet.

FIG. 13A is a view of the guide viewed in the transport direction, FIG. 13B is a schematic explanatory view of a transport position of the lens sheet, and FIG. 13C is a schematic explanatory view of a transport position of a normal sheet. In the figure, although the shapes or the like of the lens sheet L and the convex portion 14 are different from actual ones, they are employed for the convenience of the description.

As illustrated in the figure, when the position in the Y direction of the lens sheet L during the recording on the lens sheet L and the position in the Y direction of the paper during the recording on the paper S are changed, the mark from the convex portion 14 does not remain on the paper S. In other words, the convex portion 14 of the guide 3 is provided at a position at which the lens sheet L passes through and the paper S does not pass through.

In addition, in order to change the position in the Y direction of the lens sheet L or the paper S during the transportation, a transport position switching mechanism may be provided in a transport mechanism. Otherwise, a feed tray may be configured to switch between accommodation positions in the Y direction of media (the lens sheet L or the paper S) in the feed tray when the lens sheet L or the paper S is accommodated in the feed tray (for example, see FIG. 19B), and the transport mechanism may be configured to transport the medium from the feed tray only in the transport direction as it is.

Modified Examples of Pressing Roller
About Configuration

In the embodiment described above, the transport roller 4 or the roller 24 other than the transport roller 4 is configured as the pressing roller for pressing the lens sheet L against the guide 3 (in the following description, both the transport roller 4 and the pressing roller 24 may be called a "pressing roller"). Here, a pressing element for pressing the lens sheet L against the guide 3 may not be rotatable like a roller. For example, the pressing element may be made of a low-friction member so that the pressing element does not rotate and the lens sheet L slides between the pressing element and the guide 3. In addition, the pressing element may not have a shape like the roller.

About Arrangement

In the recording apparatus 100 of FIG. 3, the transport roller 4 which is the pressing roller has a width greater than that of the lens sheet L. However, the pressing roller may have a width smaller than that of the lens sheet L.

Since the pressing roller presses the lens sheet L against the guide 3 in order to prevent skewing of the lens sheet L, the pressing roller may be opposed to at least the position where the convex portion 14 of the guide 3 is formed.

Figure 14:
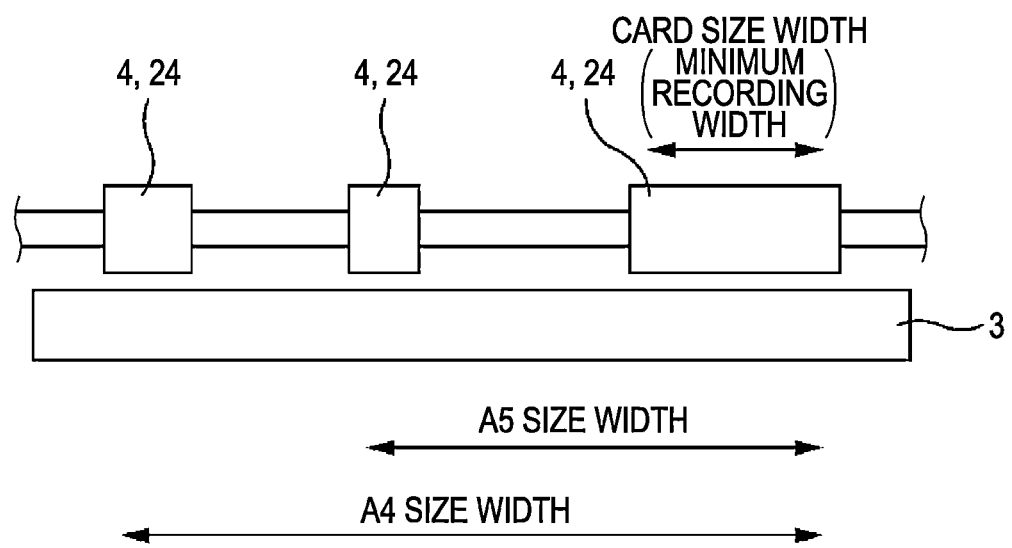
FIG. 14 is an explanatory view of an example of a pressing roller for the guide of FIG. 12C.

FIG. 14 is an explanatory view of an example of a pressing roller for the guide of FIG. 12C. As described above, in a case where a plurality of formation positions of the convex portions 14 exist, the pressing rollers may be provided to be opposed to the convex portion formation positions. Of course, even in the case of FIG. 12C, a length of the pressing roller may be longer than the width of the lens sheet L. As shown in FIG. 14, the pressing rollers or pressing members press are configured to press against various recording mediums when transported. In this embodiment, the pressing rollers are separated from each other in an orthogonal direction from a transport direction of the recording medium and include a first pressing member (furthest right), a second pressing member (furthest left) and a third pressing member. The first pressing member has a width so as to press against a first recording medium that is a minimum size (e.g. the card size width for recording on a card size medium). The width of the first pressing member is greater than the width of the second pressing member and the width of the second pressing member is greater than the width of the third pressing member, the second and third pressing members being positioned such that the first and second pressing members press both sides of a second recording medium (e.g. an A4 size width medium) and the first and second pressing member press both sides of a third recording medium (e.g. an A5 size width medium).

About Surface Shape

Concaves and Convexes may be formed on a surface of the above-mentioned pressing roller.

Figure 15A:
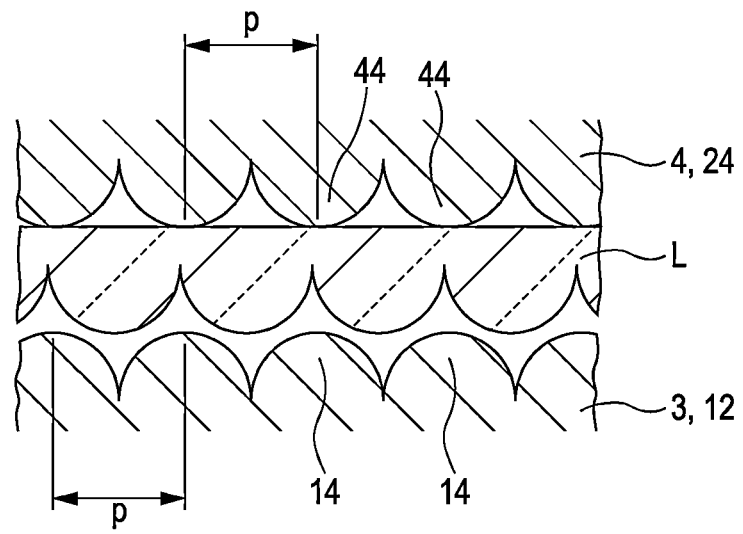
FIG. 15A is an explanatory view of a modified example of the pressing roller provided with convex portions on its surface.

FIG. 15A is an explanatory view of a modified example of the pressing roller provided with convex portions on its surface. The convex portion 44 of the pressing roller may be provided at a position opposed to the convex portion 14 of the guide 3. Therefore, an interval between the convex portions 44 of the pressing roller may be the same as the lens pitch p or integer multiples of the lens pitch p. Since the convex portion 44 of the pressing roller is at the position opposed to the convex portion 14 of the guide 3, when a pressing force is applied at the position of the VC-VC cross-section of FIG. 5A, the peak of the lens sheet L presses the valley of the guide 3 strongly, and skewing can be easily corrected.

Figure 15B:
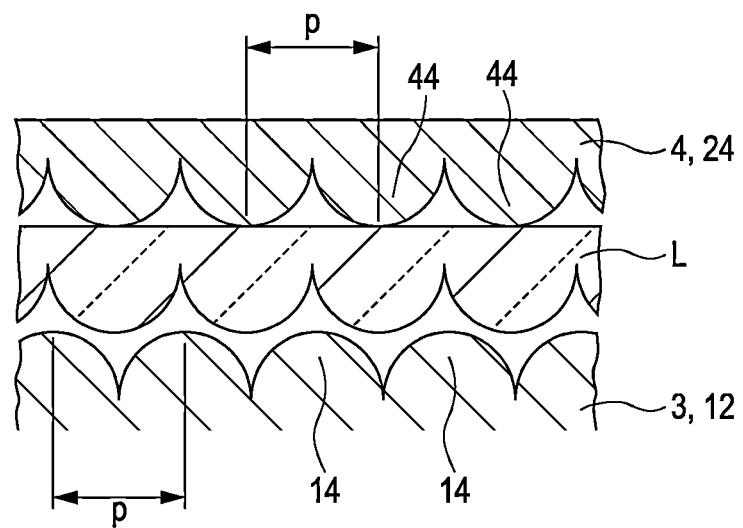
FIG. 15B is an explanatory view of another modified example of the pressing roller provided with convex portions on its surface.

FIG. 15B is an explanatory view of another modified example of the pressing roller provided with convex portions on its surface. The convex portion 44 of the pressing roller in FIG. 15B is provided at a position opposed to a location between the convex portions 14 of the guide 3. The insertion of the peak of the lens sheet L into the valley of the guide 3 from the state as illustrated in FIG. 5C causes skewing of the lens sheet L to be corrected. Therefore, the position of the convex portion 44 of the pressing roller is more advantageous in FIG. 15B as compared with in FIG. 15A.

In addition, in the case where the pressing roller is provided with the convex portion 44, an elastic member such as roller may be used so that the convex portion 44 of the pressing roller is deformable.

About Pressing Force of Pressing Roller

The recording apparatus 100 may perform recording on a paper as well as on the lens sheet L. In the recording apparatus 100, when a pressing force is exerted to the paper on the guide 3, there is a concern that a mark from the convex portion 14 may remain on the paper.

Therefore, when recording is performed on the lens sheet L, the pressing force of the pressing roller may be strengthened, and when recording is performed on the paper, the pressing force of the pressing roller may be weakened. In this case, an adjustment mechanism for adjusting the position of the shaft of the pressing roller is provided, and a controller may control the adjustment mechanism depending on the type of the medium to be recorded.

In addition, rather than to adjust the strength of the pressing force, in the case of recording on the lens sheet L, the pressing roller may be used, and in the case of recording on the paper, the pressing roller may not be used. In this case, a transferring mechanism for controlling the transfer (use/nonuse) of the pressing roller is provided, so that the controller may control the transferring mechanism of the pressing roller depending on the type of the recording medium.

About Permission of Rotation of Lens Sheet by Pressing Roller

As described above with reference to FIG. 5A, when skewing of the lens sheet L is corrected, the lens sheet L is rotated around the vertical direction as an axis. Accordingly, it is preferable that the pressing roller be configured so that the lens sheet L can be easily rotated.

Figure 16A:
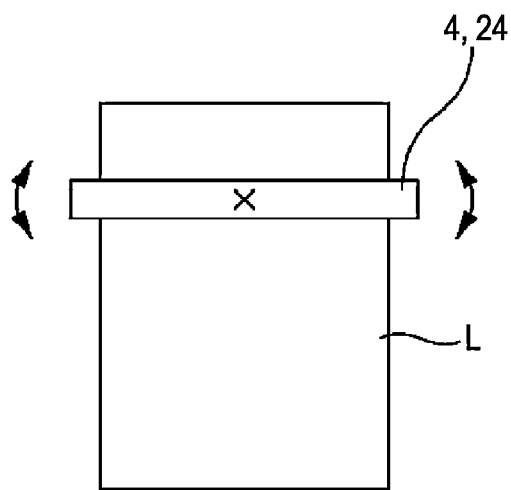
FIG. 16A is an explanatory view of a first modified example of the pressing roller.

FIG. 16A is an explanatory view of a first modified example of the pressing roller. This pressing roller is rotatable about the x mark in the figure by a supporting unit (not shown). In addition, when skewing of the lens sheet L is corrected, the peak of the lens sheet L is inserted between the convex portions 14 of the guide 3 so as to decrease the extension of the spring element (denoted by reference numeral 4A of FIG. 6A or reference numeral 24A of FIG. 6B) that generates the pressing force of the pressing roller, that is, the pressing force. Accordingly, when skewing of the lens sheet L is corrected, the pressing roller that is rotated along with the lens sheet L returns to its original position. In other words, it is preferable that the pressing force of the spring element be adjusted as described above.

Figure 16B:
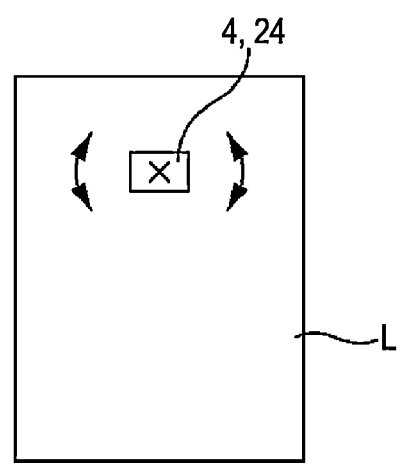
FIG. 16B is an explanatory view of a second modified example of the pressing roller.

FIG. 16B is an explanatory view of a second modified example of the pressing roller. The pressing roller has a smaller length as compared with the pressing roller of FIG. 16A. As such, with the smaller length, a frictional force exerted on the lens sheet L when the pressing roller returns to its original position after rotating may be small. In addition, in a case where a single pressing roller with such a smaller length is provided, it is preferable that the pressing roller be disposed at the center (the center of the width in the Y direction) of the lens sheet L. Accordingly, the pressing force exerted to the lens sheet L is not inclined.

Figure 16C:
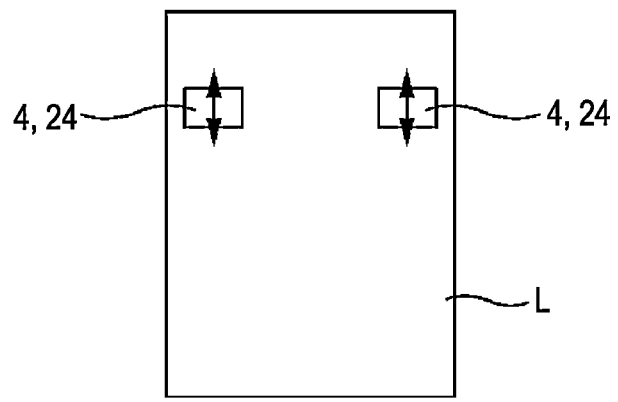
FIG. 16C is an explanatory view of a third modified example of the pressing roller.

FIG. 16C is an explanatory view of a third modified example of the pressing roller. The two pressing rollers are provided in the vicinity of both side ends of the lens sheet L. In addition, each pressing roller is movable along the transport direction. Accordingly, when skewing of the lens sheet L is corrected, the one pressing roller is moved toward the upstream side of the transport direction, and the other pressing roller is moved toward the downstream side of the transport direction to allow the rotation of the lens sheet L. As described above, one pressing roller may be supported to be movable symmetrically in the transport direction.

In addition, the configuration of the pressing roller for facilitating the rotation of the lens sheet L is not limited to the above-mentioned configuration as long as the surface of the lens sheet L is made of a low-friction member.

Position Adjustment of Guide

The guide 3 may need to be mounted in the recording apparatus 100 by adjusting the direction of the convex portion 14 to be in the transport direction. Here, an adjust method used for mounting the guide 3 will be described.

Figure 17:
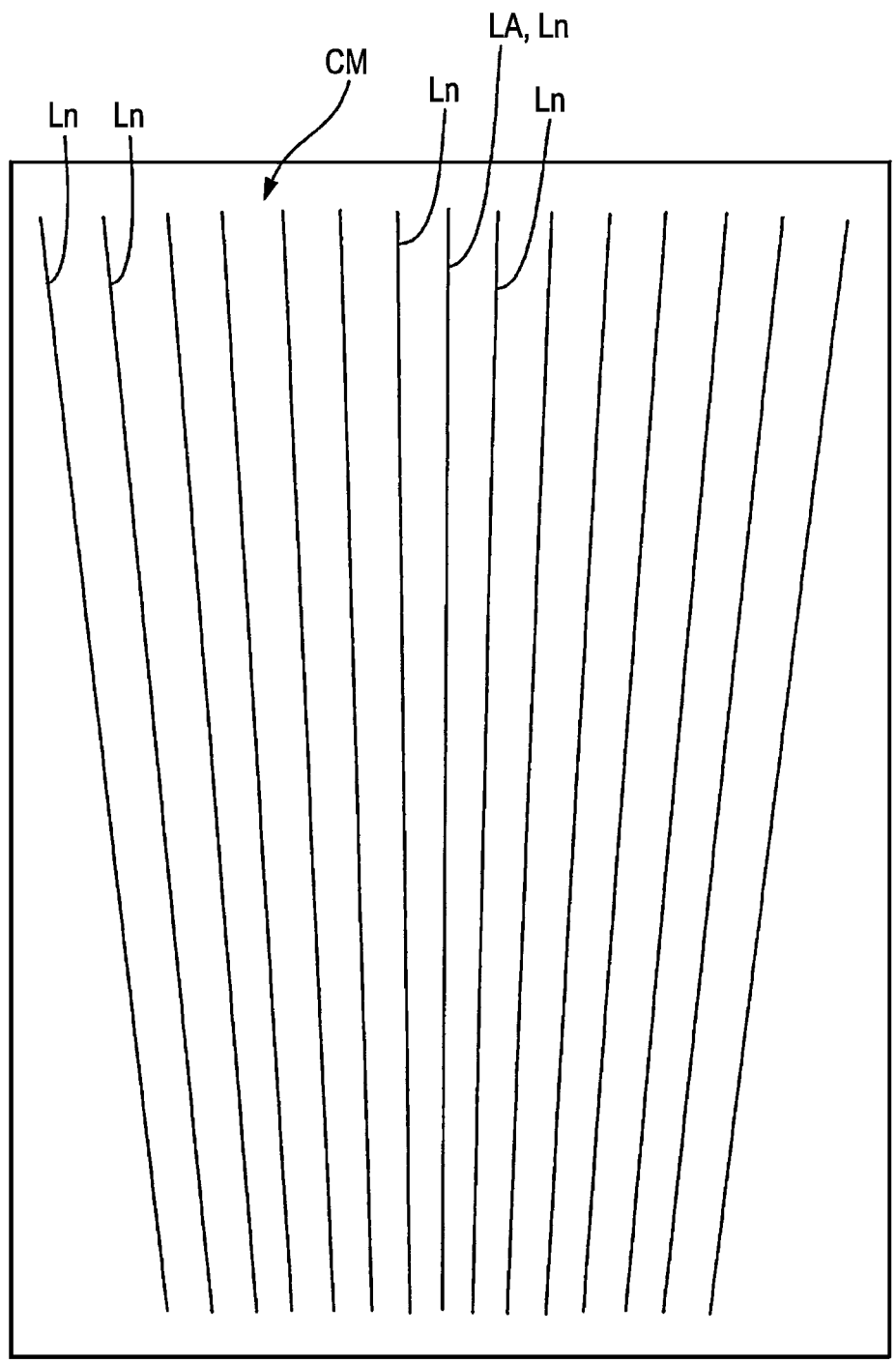
FIG. 17 is an explanatory view of an image for inspection.

FIG. 17 is an explanatory view of an image for inspection.

An image CM for inspection is an image having a plurality of lines Ln. The central line LA of the plurality of lines Ln is a line along the transport direction on the image data. The lines Ln on the left and on the right of the line LA of the image CM for inspection are lines formed by sequentially accumulating inclinations thereof by a predetermined angle. For example, the lines Ln on the right side of the line LA are set to sequentially increase the inclination angles at every 0.01 degrees clockwise toward the transport direction on the image data. In addition, the lines Ln on the left side of the line LA are set to sequentially increase the inclination angles at every 0.01 degrees counterclockwise toward the transport direction on the image data.

After the guide 3 is mounted in the recording apparatus 100, in order to inspect whether or not the generatrix direction of the convex portion 14 of the guide 3 is aligned with the transport direction, the recording apparatus 100 records the image CM for inspection on the lens sheet L. If the recording apparatus 100 is assembled in an ideal state, the line LA is recorded on the lens sheet L while being aligned with the transport direction. That is, if the recording apparatus 100 is assembled in the ideal state, the line LA will be recorded along the generatrix direction of the lens sheet L. After the recording apparatus 100 records the image for inspection on the lens sheet L, an inspector inspects the image for inspection from the side of the lenticular lens 7.

Figure 18:
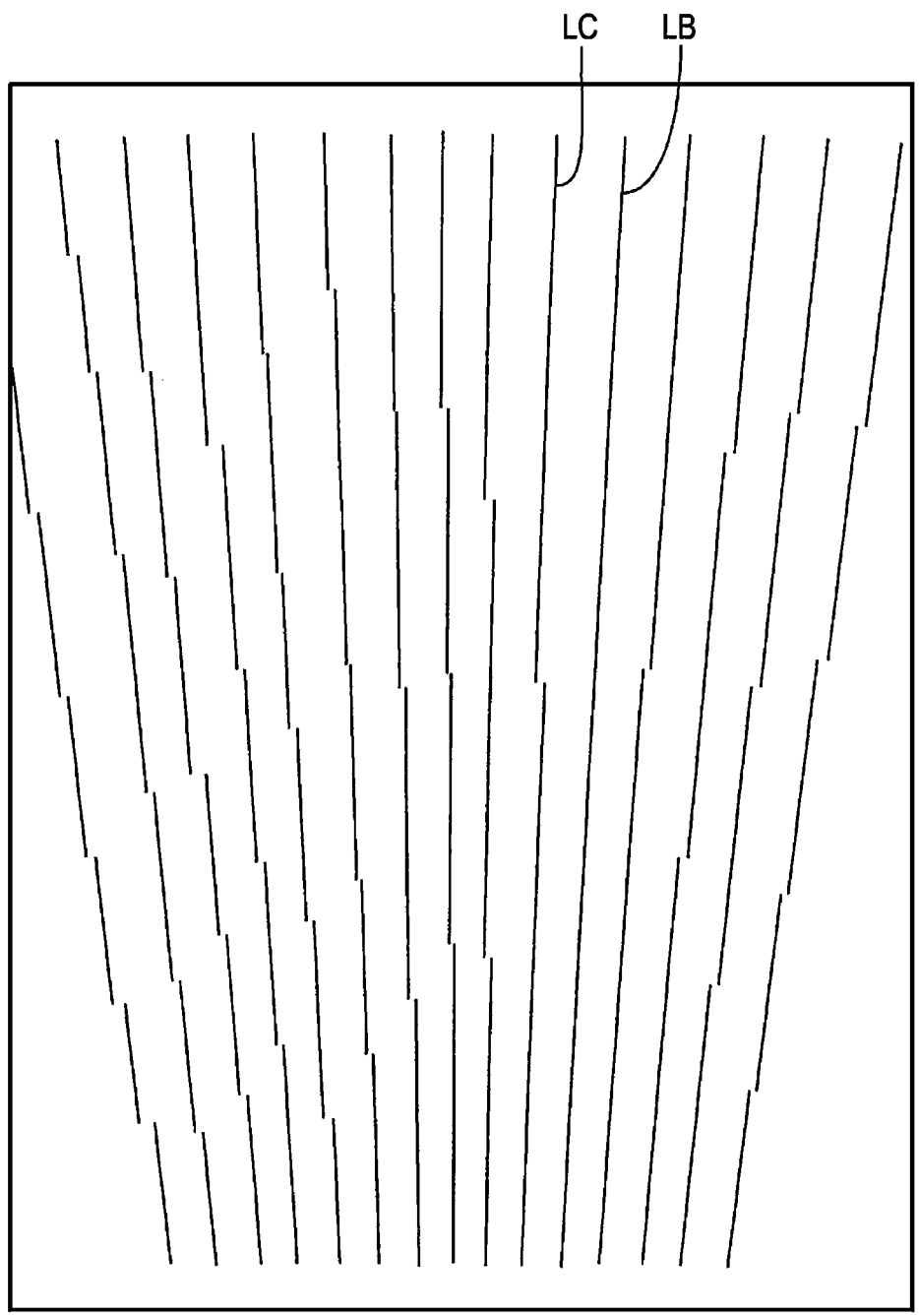
FIG. 18 is an explanatory view of the image for inspection viewed from the lenticular lens.

FIG. 18 is an explanatory view of the image for inspection viewed from the lenticular lens. Among the plurality of lines Ln, the line Ln recorded to be aligned with the generatrix direction of the lenticular lens 7 is recognizable by a single continuous line. On the other hand, the line Ln which is not recorded along the generatrix direction of the lenticular lens 7 is recorded over a plurality of the cylindrical lenses 13 and it becomes a line cut discontinuously as shown by, for example, a line LC. If the recording apparatus 100 is assembled in the ideal state, the line LA is recognized as a single line. When the generatrix direction of the convex portion 14 of the guide 3 is inclined with respect to the transport direction, the line LA is recognized as cut lines, and another line LB corresponding to the inclination angle is recognized as a single line.

Therefore, the inspector specifies a line that can be recognized as a single line and adjusts a mounting angle of the guide 3 by the angle corresponding to the line. For example, in this case, with regard to the mounting angle of the current guide 3, the mounting angle of the guide 3 is adjusted to be inclined at 0.03 degrees. Accordingly, the guide 3 is mounted in the recording apparatus 100 so that the convex portion 14 of the guide 3 is aligned with the transport direction.

In addition, in the description above, the inspector recognizes the image for inspection which is recorded on the lens sheet L, however, the description is not limited thereto. For example, a scanner may read the image for inspection which is recorded on the lens sheet L and determine the mounting angle of the guide 3 on the basis of the reading result.

Modified Example of Feeding

In the embodiment described above, the lens sheet L is supplied from the rear side of the recording apparatus 100. However, the configuration is not limited thereto.

Figure 19A:
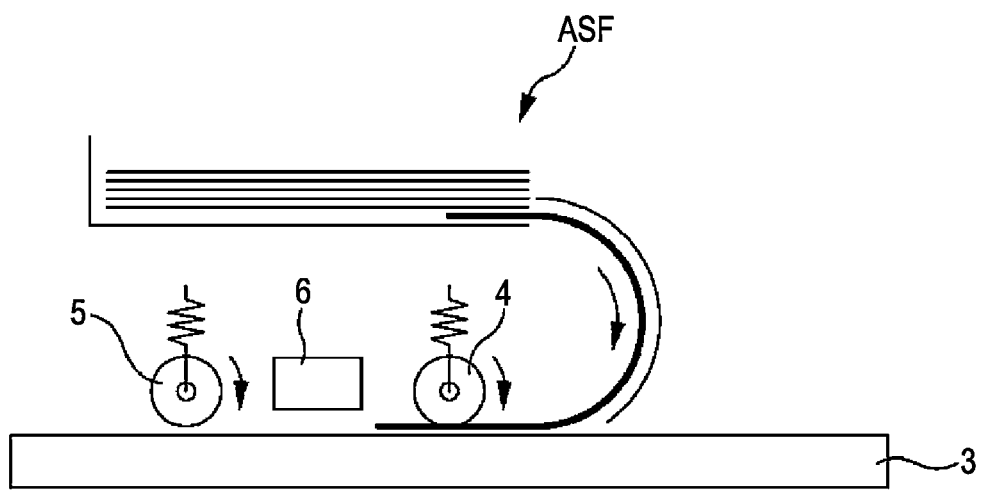
FIG. 19A is an explanatory view of a recording apparatus having an ASF.

FIG. 19A is an explanatory view of a recording apparatus having an ASF (Auto Sheet Feeder). As such, the lens sheet L may be supplied from an upper side of the recording apparatus 100.

Figure 19B:
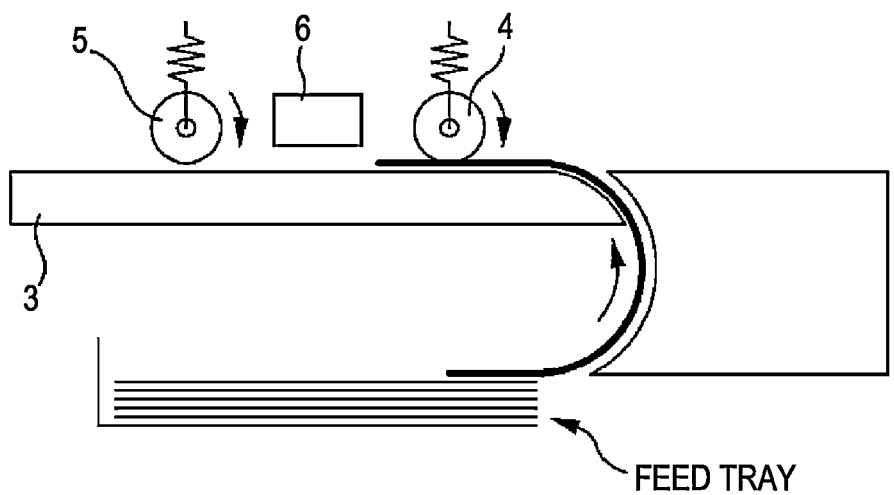
FIG. 19B is an explanatory view of a recording apparatus having an openable and closable feed cassette.

FIG. 19B is an explanatory view of a recording apparatus having an openable and closable feed cassette on a front side of the recording apparatus. In this case, the lens sheet L may be supplied from a lower side of the recording apparatus.

In any case, since the lens sheet L is transported while being pressed on the guide 3 before the head 6 performs recording on the lens sheet L, the lens sheet L can be transported in the transport direction with good precision.

OTHER EMBODIMENTS

While the recording apparatus using the head has been described above according to the embodiment, the embodiment is provided for easy understanding of the invention and is not intended to limit the invention. Modifications and Improvements can be made without departing from the spirit and scope of the invention, and needless to say that equivalent matters are included in the invention.

About Pressing Member

In the embodiment described above, the transport roller 4 or the pressing roller 24 other than the transport roller 4 is used as the pressing member for pressing the lens sheet L against the guide 3. However, when the lens sheet L is supplied to the recording apparatus while the lens sheet L is pressed against the guide 3 by, for example, a finger, skewing of the lens sheet L can be prevented and corrected even though the pressing roller is not provided.

What is claimed is:

1. A recording apparatus comprising:
   a recording head for ejecting ink on a medium having a lenticular lens;
   a transport mechanism comprising:
   one or more transport rollers that transport any of a plurality of recording medium of differing sizes along a conveyance path, each recording medium of the plurality having a lenticular lens and an image formation layer; and
   a plurality of pressing members that press the recording medium against a guide formed along the conveyance path adapted to align the medium having a lenticular lens by contacting the lenticular lens when the medium is transported by the one or more transport rollers of the transport mechanism, wherein the plurality of pressing members are disposed so as to be separated from each other in an orthogonal direction from a transport direction of the recording medium, wherein the plurality of the pressing members press against the image formation layer when the respective recording medium is transported in the recording apparatus;
   wherein the plurality of the pressing members includes a first pressing member;
   when the transport mechanism transports a first recording medium of the plurality that is a minimum size of recording medium, the first recording medium is pressed by the first pressing member, and
   when the transport mechanism transports a second recording medium that is a larger size of recording medium than the first recording medium, the second recording medium is pressed by the first pressing member and at least one pressing member of the plurality other than the first pressing member; and
   a controller that controls ejection of ink from the recording head and transportation of the medium having a lenticular lens along the conveyance path with the transport mechanism, the controller being configured to record an image on the image formation layer according to an alignment of the lenticular lens provided by the guide such that the image is recognizable when viewed from a side of the lenticular lens.

2. The recording apparatus according to claim 1,
   wherein each pressing member has a width in the orthogonal direction, wherein the width of the first pressing member is greater than the width of another pressing member of the plurality.

3. The recording apparatus according to claim 2,
   wherein the plurality of the pressing members includes a second pressing member and a third pressing member;
   wherein the second pressing member is furthest from the first pressing member in the orthogonal direction than any other pressing member of the plurality,
   wherein the width of the first pressing member is greater than the width of the second pressing member, and
   the width of the second pressing member is greater than the width of the third pressing member.

4. The recording apparatus according to claim 3,
   wherein, when the transport mechanism transports the second recording medium,
   the second recording medium is pressed by the first pressing member and another pressing member in a vicinity of both side ends, respectively, in the orthogonal direction.

5. The recording apparatus according to claim 4,
   wherein, each pressing member is a roller.

6. The recording apparatus according to claim 5,
   wherein the plurality of pressing members are disposed upstream to the head in the direction of transporting the recording medium.

7. The recording apparatus according to claim 1, wherein the plurality of pressing members are separated from the one or more transport rollers in the transport direction.

8. The recording apparatus according to claim 1,
   wherein the plurality of pressing members are absent any opposing roller, and
   wherein the plurality of pressing members are opposite the guide so as to press the recording medium against the guide during transport of the recording medium.

9. The recording apparatus according to claim 1, wherein there is a distance between the one or more transport rollers and the plurality of pressing members along the transport direction.

10. The recording apparatus according to claim 1, further comprising:
    a platen opposing the recording head along the conveyance path, wherein the guide is separate from and upstream from the platen along the conveyance path.

11. The recording apparatus according to claim 1, wherein the guide comprises a plurality of convex portions formed in the transport direction and arranged to guide alignment of the medium having a lenticular lens by contact with the lenticular lens.

12. The recording apparatus according to claim 1, wherein the controller is configured to record an image on the image formation layer according to alignment of the lenticular lens provided by the guide regardless of a relative alignment of an edge of the medium such that, when alignment of the edge of the medium differs from an alignment of the lenticular lens such that the edge is not aligned with the transport direction, the guide still provides alignment of the lenticular lens so that the device provides precision recording of the image on the image formation layer within a lens array of the lenticular lens such that the image is recognizable when viewed from a side of the lenticular lens.

13. The recording apparatus according to claim 1, further comprising:
    the medium having a lenticular lens.

* * * * *